United States Patent [19]

DiBianca

[11] Patent Number: 4,707,608

[45] Date of Patent: Nov. 17, 1987

[54] KINESTATIC CHARGE DETECTION USING SYNCHRONOUS DISPLACEMENT OF DETECTING DEVICE

[75] Inventor: Frank A. DiBianca, Chapel Hill, N.C.

[73] Assignee: University of North Carolina at Chapel Hill, Chapel Hill, N.C.

[21] Appl. No.: 721,727

[22] Filed: Apr. 10, 1985

[51] Int. Cl.$^4$ .................. G01T 1/185; H01J 47/00
[52] U.S. Cl. ......................... 250/389; 250/336.1; 250/370; 250/374; 250/385; 378/19
[58] Field of Search .................... 378/62, 19; 250/389, 250/385 R, 382, 375, 374, 370 G, 370 GX, 370 H, 370 I, 370 R, 363 R, 338 SE, 390 K, 336.1, 338 R

[56] References Cited

U.S. PATENT DOCUMENTS

| | | | |
|---|---|---|---|
| 3,963,924 | 6/1976 | Boag et al. | 378/30 |
| 3,983,398 | 9/1976 | Boyd | 378/14 |
| 3,995,159 | 11/1976 | Elliott | 250/370 |
| 4,031,396 | 6/1977 | Whetten et al. | 250/385 |
| 4,047,040 | 9/1977 | Houston | 250/385 |
| 4,057,728 | 11/1977 | Peschmann et al. | 250/374 |
| 4,075,492 | 2/1978 | Boyd et al. | 378/7 |
| 4,150,290 | 4/1979 | Erskine et al. | 250/283 |
| 4,179,608 | 12/1979 | Walenta | 250/385 |
| 4,239,967 | 12/1980 | Carr et al. | 250/281 |
| 4,286,158 | 8/1981 | Charpak et al. | 250/374 |
| 4,301,368 | 11/1981 | Riihimaki | 250/385 |
| 4,311,908 | 1/1982 | Goulianos et al. | 250/374 |
| 4,317,038 | 2/1982 | Charpak | 250/385 |
| 4,320,299 | 3/1982 | Bateman et al. | 250/374 |
| 4,378,499 | 3/1983 | Spangler et al. | 250/287 |
| 4,485,307 | 11/1984 | Osborne et al. | 250/385 |

FOREIGN PATENT DOCUMENTS 1488258 10/1977 United Kingdom.

OTHER PUBLICATIONS

F. A. DiBianca and M. D. Barker, "Kinestatic Charge Detection", *Medical Physics*, vol. 12, No. 3 (May/Jun. 1985), pp. 339–343.
French Thesis by Olivier Peyret, "Study of a Multiline Digital Radiographic Imager by Synchronized Scanning on the Ion Drift of a Gas Detector"; English translation of Thesis by Joan E. Fetter.
"Computed Radiography" by Foley and DiBianca, *Radiology of the Skull and Brain: Technical Aspects of Computed Tomography*, chapter 28, pp. 4312–4325 (Newton & Potts, 1981).

(List continued on next page.)

Primary Examiner—Janice A. Howell
Assistant Examiner—Constantine Hannaher
Attorney, Agent, or Firm—Cushman, Darby & Cushman

[57] ABSTRACT

A technique for detecting the spatial distribution of propagating energy induces secondary energy produced in a detector to drift in a predetermined direction at a predetermined velocity and synchronously moves the detector in a direction opposite to the direction of drift of the secondary energy at a velocity equal in magnitude to the magnitude of the velocity of drift of the secondary energy. Although the secondary energy is drifting with respect to the detector, the synchronous detector movement causes the secondary energy to appear stationary with respect to a source of radiation, resulting in "kinestatis" of the secondary energy. The secondary energy resulting from the radiation integrates along stationary paths in the detector (operated as a "kinestatic detector") and is subsequently detected when a collection volume of the detector sweeps through the stationary secondary energy. Signal integration can occur over long periods of time while resolution in the direction of movement of the detector is determined by the detector output sampling rate. A detector having n-by-1 detecting elements can simulate the operation of an n-by-m element detector for use in digital radiography and computed tomography and other imaging and non-imaging sensing techniques. The detector may take the form of a xenon gas ionization chamber. Field distortion eliminating techniques are used to eliminate variations in charge carrier drift velocity in such an ionization chamber. Charge carrier mobility and drift velocity are adjusted to synchronize charge carrier movement with detector movement.

114 Claims, 22 Drawing Figures

OTHER PUBLICATIONS

"The Time Projection Chamber", American Institute of Physics Conference Proceedings No. 108 (Vancouver, 1983) (New York, 1984).

Rossi et al, *Ionization Chambers and Counters: Experimental Techniques,* Chapter 3 at 31–71 (McGraw Hill, 1948).

Zurmuhle et al, "A ΔE–E Telescope with Very Large Solid Angle", 203 *Nuclear Instruments and Methods,* 261–67 (1982).

Berceanu et al, "Detection and Identification of Heavy Ions at 180° Using a Proportional Δ–E–E Chamber", 35 *Stud. and Cercet. Fiz.,* No. 5, 503–505 (Rumania, 1983).

Fenster et al, "Characteristics of a Linear Xenon Detector Array for Scanned Projection Radiography", *Proceedings of the AAPM Summer School,* 214–44 (1984).

Drost et al, "A Xenon Ionization Detector for Digital Radiography", vol. 9, No. 2, *Med. Phys.,* 224–30 (1982).

Rutt et al, "A Xenon Ionization Detector for Scanned Projection Radiography: Theoretical Considerations", vol. 10, No. 3, *Med. Phys.,* 284–92 (1983).

Peschmann, "Xenon Gas Ionization Detectors", *Radiolog of the Skull and Brain Technical Aspects of Computed Tomography,* Section 3, pp. 4112–4126 (Newton & Potts, 1981).

Johns et al, "Gas Ionization Methods of Electrostatic Image Formation in Radiography", 47 *British Journal of Radiology,* 519–29 (1974).

Wilkinson, *Ionization Chambers and Counters,* §4.2, 59–62 (Cambridge Press, 1950).

Butz–Jorgensen et al, "Investigation of Fission Layers for Precise Fission Cross-Section Measurements With a Gridded Ionization Chamber", 86 *Nuclear Science and Engineering,* 10–21 (1984).

Asselineau et al, "Performance of a Bragg Curve Detector for Heavy Ion Identification", 204 *Nuclear Instruments and Methods,* 109–15 (1982).

Hotzl et al, "Experiences With Large-Area Frisch Grid Chambers in Low-Level Alpha Spectrometry", 22 *Nuclear Instruments and Methods in Physics Research,* 290–94 (1981).

DiBianca et al, "Digital Radiography of the Chest Using a Computed Tomography Instrument", 133 *Radiology,* 231 (1979).

DiBianca et al, "Intravenous Angiography Using Scanned Projection Radiography: Preliminary Investigation of a New Method", 15 *Investigative Radiology,* 220 (1980).

"Design of Grid Ionization Chambers" by O. Bunemann et al, *Canadian Journal of Research,* Section A, A27 (1949).

"The Practical Realisation and Performance of Sprite Detectors", A. Blackburn et al, *Infrared Physics,* vol. 22, pp. 57 to 64 (1982).

"An Integrating Detector for Serial Scan Thermal Imaging", by C. T. Elliot et al, *Medical Physics,* vol. 22, pp. 31–42 (1982).

"Simple Dielectric Liquids Mobility, Conduction, and Breakdown", by T. J. Gallagher, pp. 10–21, Clarendon Press, Oxford (1975).

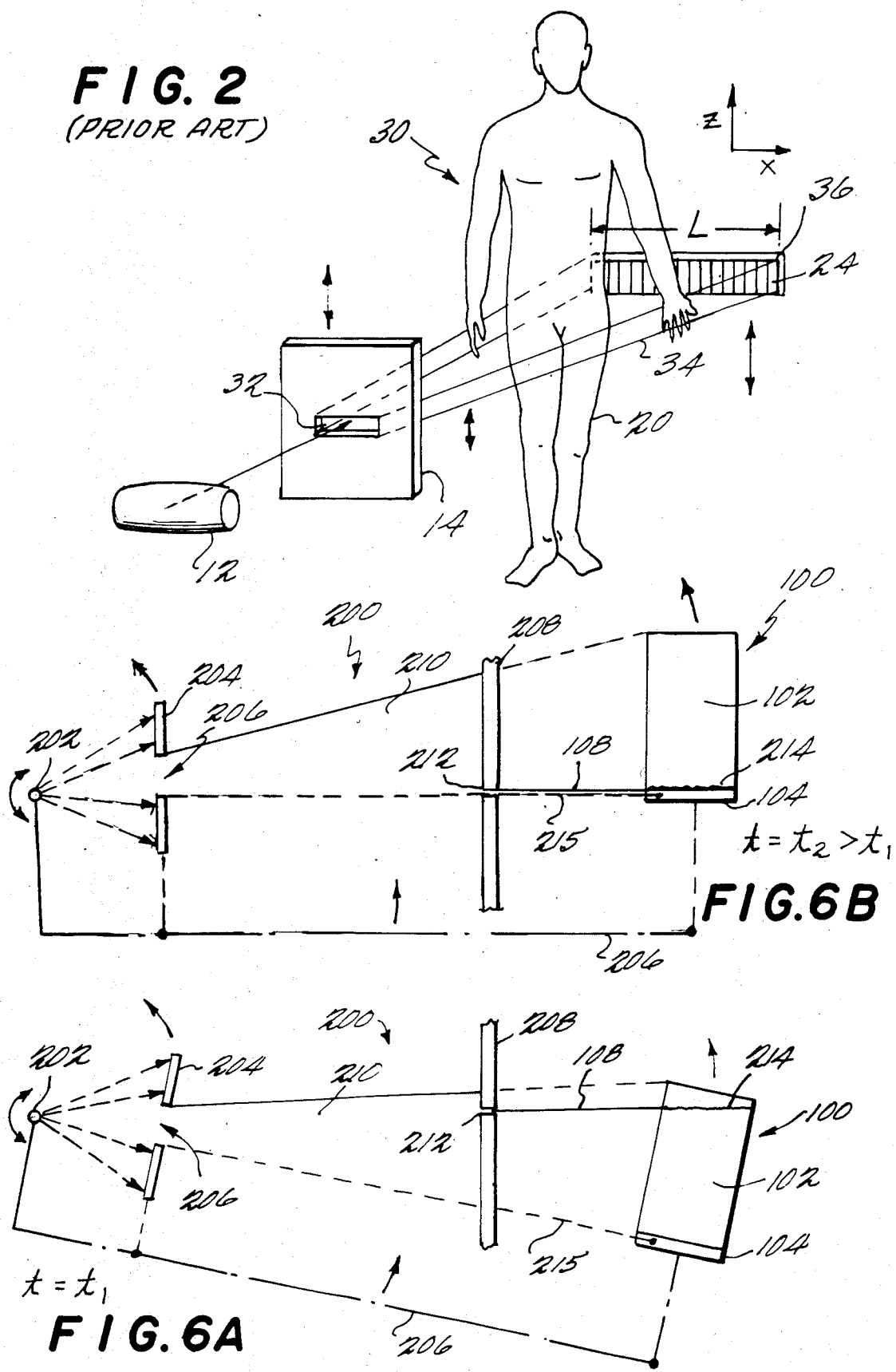

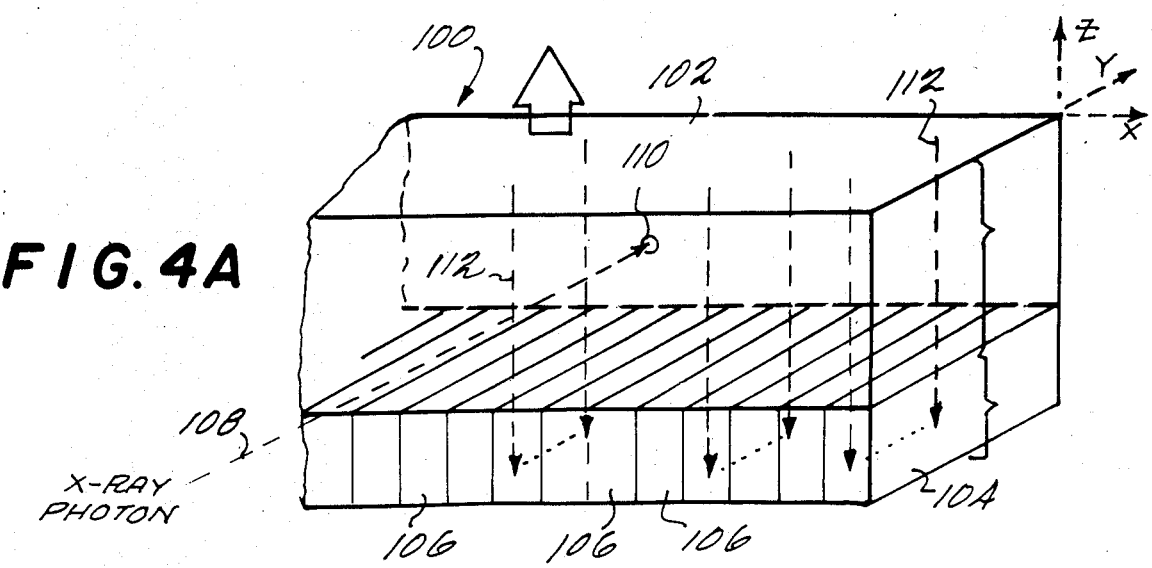
FIG. 4A
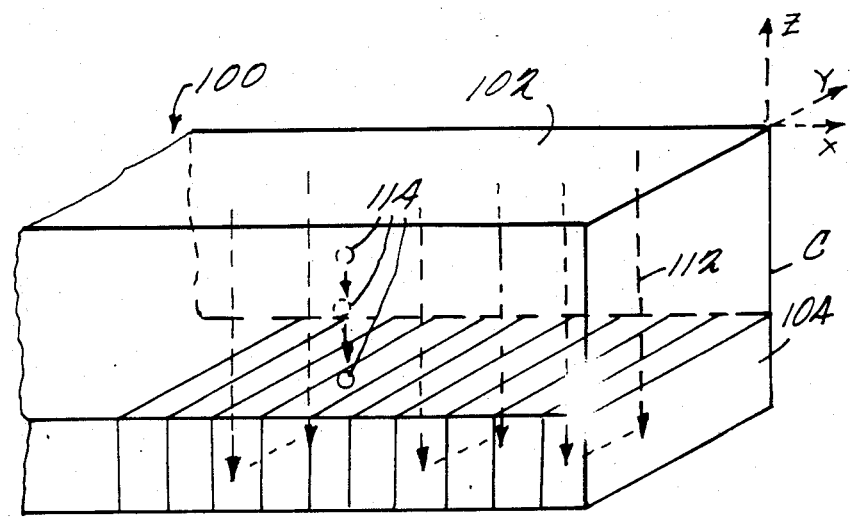
FIG. 4B
FIG 5A  FIG. 5B  FIG. 5C
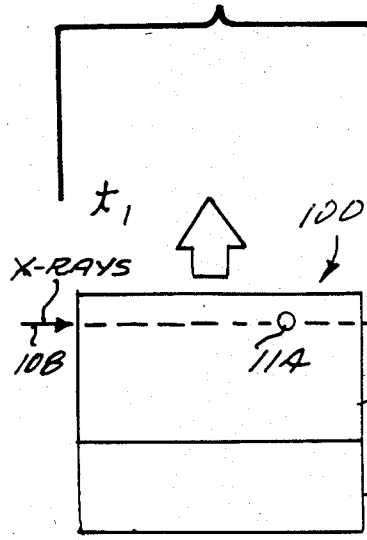
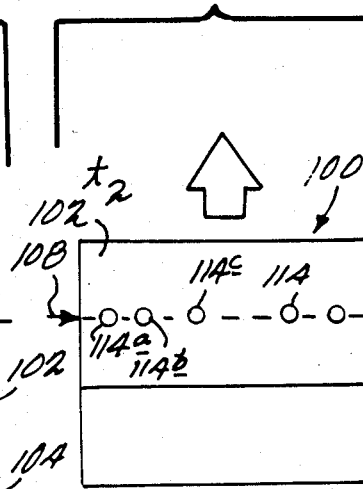
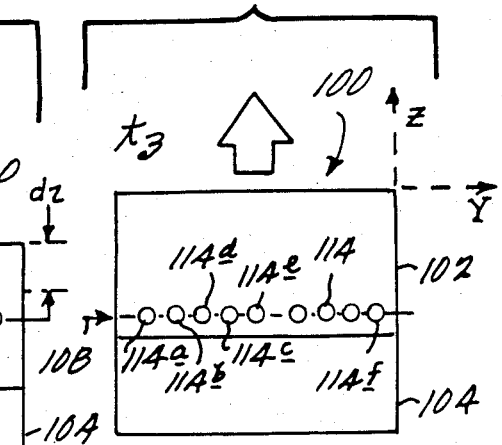

KINESTATIC CHARGE DETECTION USING SYNCHRONOUS DISPLACEMENT OF DETECTING DEVICE

FIELD OF THE INVENTION

The present invention is related to the detection of the spatial distribution and intensity of radiation. More particularly, the present invention is related to radiography and computed tomography imaging devices which produce images of the density of a body by detecting the spatial distribution and intensity of x-rays passing through the body.

BACKGROUND OF THE INVENTION

The optimal detection of ionizing radiation in two dimensions is the central problem in computed tomography, digital radiography, nuclear medicine imaging and related disciplines. Many different types of detectors (e.g. non-electronic, analog electronic and digital electronic detectors) have been used with varying degrees of success in these fields. In general, many compromises have been made among the various imaging and non-imaging parameters of prior art detectors in developing operational systems.

It has been recognized for some time that there is no fundamental impediment to the replacement of film and other non-digital radiographic techniques with digital detection methods, and that the basic problems was one of developing a suitable detector and data acquisition system (DAS). See generally Foley & DiBianca, "Computed Radiography" in *Radiology Of The Skull And Brain: Technical Aspects of Computed Tomography* at chapter 128, pages 4312–25 (Newton & Potts 1981). One proposed digital radiography system 10 is shown schematically in FIG. 1. A source of x-rays 12 radiates x-radiation toward a collimator 14. An approximately square aperture 16 is defined in collimator 14 to direct an approximately square x-radiation distribution (i.e. wide area beam) 18 toward a patient 20. X-rays produced by source 12 which do not pass through aperture 16 are blocked by collimator 14 (which preferably is made of a very dense material such as lead or the like) and therefore do not strike patient 20. The portions of wide area beam 18 passing through patient 20 travel further to strike an approximately square detector 22 positioned behind patient 20. The intensity of the radiation exiting patient 20 along any path depends on the integrated x-ray attenuation coefficient of the patient along that path.

Detector 22 has a side 23 having a length L of approximately 50 centimeters to match the size of beam 18 after it is passed through patient 20 (because x-ray source 12 resembles a point source, wide-area beam 18 spreads as it travels away from collimator 14). Detector 22 produces signals corresponding to the intensity of the x-radiation at the various points in the two dimensions of the detector which can be further processed by conventional techniques to obtain an image of the projection of the density of patient 20 onto the two-dimensional plane of the detector.

Detector 22 comprises a plurality of discrete detecting elements 24 arranged in a two-dimensional coordinate array. If the desired limiting spatial resolution of system 10 is five line pairs/mm, each detecting element 24 would have a square dimension s of length 0.125 mm (see FIG. 1A) for a magnification of 1.25. Wide-area detector 22 would then contain $n^2$ elements with n equal to 4000 (for a total of 16 million discrete elements).

It is not feasible at present to construct such a large detector 22 with so many discrete electronic elements 24. Therefore, devices with continuous detectors have been proposed and evaluated for digital radiography. Examples of such continuous detectors are large area image intensifiers, see Rowlands et al, XII *Optical Instrumentation in Medicine* (SPIE, Washington 1984), and photostimulable phosphor screens, see Sonada et al, 148 *Radiology* 833 (1983). Such continuous detectors, however, have problems with scattered radiation acceptance, limited detective quantum efficiency, light spreading and other difficulties which limit system performance.

The above-mentioned problems of continuous detectors may be largely overcome along with the problems of the mechanical and electronic complexity of an $n^2$ discrete element detector by utilizing a thin scanning fan beam of radiation and an n-by-one element detector. See, for example, U.S. Pat. No. 3,983,398 to Boyd (1976); U.S. Pat. No. 4,075,492 to Boyd et al (1978); DiBianca et al, 133 *Radiology* 231 (1979); and DiBianca et al, 15 *Inv. Radiology* 220 (1980). An example of a known scanning fan beam radiography system 30 is shown schematically in FIG. 2. A collimator 14 defines a slot 32 through which x-radiation produced by x-radiation source 12 is directed. The resulting fan-shaped beam 34 is directed through the patient 20 onto an n-by-one element detector 36 comprising n discrete detecting elements 24 arranged in a linear array along an x-coordinate coordinate axis. The fan-shaped beam 34 is scanned over the portions of patient 20 of interest by moving collimator 14. Detector 36 is moved simultaneously in a direction perpendicular to the plane of beam 34 (such as by linearly translating an arm, not shown, on which collimator 14 and the detector are commonly mounted) so that beam 34 is always incident on detector 36. A focused grid collimator may be interposed between patient 20 and detector 36 for collimating the radiation penetrating the patient onto the detector. The position in an x coordinate direction of an element 24 of detector 36 producing a signal indicates the position in the x direction of the z-radiation causing the signal to be produced by the element. The position of detector 36 in a z-coordinate direction (i.e., scanning direction) perpendicular to the x direction at the time the signal is produced indicates the position in the z direction of the x-radiation producing that signal.

Unfortunately, a number of difficulties are also involved with thin scanning fan beam system 30. The very thin (approximately 0.1 mm) x-radiation fan beam 34 required for a resolution of five line pairs/mm uses the x-ray flux produced by source 12 very inefficiently and thus produces either excessive image noise or unacceptably long scan times and excessive x-ray source (tube) loading. In addition, the focal spot penumbra of system 30 seriously degrades spatial resolution of the system in the scanning (z) direction.

One compromise solution is to use an n-by-m detector geometry with, for example, $m = \sqrt{n}$ together with a thick fan beam, sometimes called a "strip" beam. Such a system is disclosed in Wang et al, *XII Optical Instrumentation In Medicine* 250 (SPIE, Washington, 1984). Although such a device might overcome some of the physical problems discussed above, it is unclear how a discrete element detector and data acquisition system with the 4000 by 64 (i.e. 256,000) channels necessary to obtain useful resolution could be constructed in practice.

Xenon gas ionization detectors have been used successfully in a number of third generation commercial and experimental computed tomography and digital radiography systems. A typical xenon detector 50 for use in digital radiography is illustrated in FIG. 3. Detector 50 comprises a high voltage plate 52 and a collection plate 54 disposed parallel to the high-voltage plate. The space 56 between plates 52 and 54 is filled with a pressurized quantity of high atomic number ionizable gas such as xenon. Space 56 comprises a detection volume in which ionizing events are produced in the xenon gas by x-rays 59 incident thereto.

A strong electric field is produced between plates 52 and 54 by applying a high electric potential across the plates. Positive ions produced in space 56 by absorption of incident x-ray are attracted to collection plate 54, and electrons are attracted to high-voltage plate 52. Since the number of ion-electron pairs produced in space 56 is proportional to the intensity of the radiation incident on detector 50, the current flowing in collection plate 54 can be used as an indicator of incident x-ray intensity (or the transmissivity of an object interposed between the x-ray source and detector 50).

Plate 54 comprises a circuit board 57 etched to form an array of conductive collection electrodes 58. The collection electrodes 58 are focused on the source of x-rays (i.e. an x-ray tube focal spot) and therefore may be wider at the rear 60 of detector 50 than at the front 62 of the detector. A respective detection volume is defined by each of collection electrodes 58, the detection volume having a length L and width W defined by the length and width of the collection electrode 58 and having a height H defined by the separation between collection plate 58 and high-voltage plate 52.

In the detector 50 shown in FIG. 3, there are no separating elements between individual detection volumes. This makes the construction of an array of elements with submillimeter widths W relatively straightforward, permitting an n-by-one detector which has a large number of detection volumes per unit length to be constructed. The absence of separating elements between detection volumes may lead to degradation of spatial resolution due to cross-talk between adjacent detection volumes, However, at high gas pressures, the cross-talk for collection electrodes 58 having a width of 0.5 mm falls to less than 10% because the gas itself restricts charge carriers formed in one detection volume from moving to adjacent detection volumes. See Fenster et al, "Characteristics of A Linear Xenon Detector Array For Scanned Projection Radiography", *Proceedings of the AAPM Summer School* 214–44 (1984); Drost et al, "A Xenon Ionization Detector For Digital Radiography", Vol. 9, No. 2, *Med Phys.* 224–30 (1982); and Rutt et al, "A Xenon Ionization Detector For Scanned Projection Radiography: Theoretical Considerations", Vol. 10, No. 3 *Med. Phys.* 284–92 (1983).

An analysis of the theory and performance of a xenon gas ionization detector wherein alternating planar high-voltage and collector electrodes define gaps in which charge carriers are produced by x-radiation entering through the front window of a hermetically sealed housing is disclosed in Peschmann, "Xenon Gas Ionization Detectors" in *Radiology of the Skull and Brain: Technical Aspects of Computed Tomography*, Section 3, pages 4112–26 (Newton & Potts 1981) and U.S. Pat. No. 4,031,396 to Whetten et al. In the system discussed by Peschmann, the x-radiation beam is pulsed and the resulting charges collected by the detection elements are integrated over time to decrease signal quality degradation produced by the natural fluctuations of the x-radiation beam intensity.

Parallel-plate gas ionization chambers have been used for medical imaging in other ways in the past. Johns et al, "Gas Ionization Methods of Electrostatic Image Formation in Radiography", 47 *British Journal of Radiology* 519-29 (1974) discloses a wide-gap chamber containing a pressurized high-Z gas which is ionized by a pencil beam of x-radiation. Johns et al discuss the radial distribution of produced charge carriers and the effect of ion diffusion on ion detection.

U.S. Pat. No. 4,286,158 to Charpak et al (1981) discloses an ion chamber using photomultiplier tubes to detect the positions and brightnesses of scintillations produced by the formation of secondary photons to ascertain radiation spatial distribution and intensity. U.S. Pat. No. 4,317,038 to Charpak (1982) discloses a similar ion chamber operated as a multi-wire proportional chamber. In this latter device, flat grids disposed in the chamber induce charge multiplication from photo-electrons produced by x-radiation absorbed by a noble gas within the chamber. The multiplied charges are detected by a set of electrode wires.

U.S. Pat. No. 4,320,299 to Bateman et al (1982) discloses an ionization chamber with a position-sensitive multi-wire array on which an electrical charge is induced by charge multiplication of electrons and positive ions. U.S. Pat. No. 4,485,307 to Osborne et al (1984) discloses a similar spatial detection gas ionization chamber including detector wires formed in a crossed mesh pattern.

U.S. Pat. No. 4,057,728 to Peschmann et al (1977) teaches a gas ionization chamber adapted for x-ray detection which includes an insulating foil imaging plane displaced in the longitudinal direction of the chamber by a variable amount dependent on the x-ray angle of incidence. A follower control system controlled by the x-ray angle of incidence moves a carriage on which the insulating foil is mounted.

U.S. Pat. No. 3,963,924 to Boag et al (1976) discloses a xenon gas ionization chamber including electrodes with spherically curved surfaces. The effect of the curved surfaces is to maintain the x-ray beam passing through the object to be imaged normal to the electrode surfaces. In this way, the lines of force of the collecting field are always parallel to the quantum paths of the ions formed by the incident x-rays.

Gas ionization chambers have been used for many years for a variety of applications other than medical imaging. For instance, gas ionization drift chambers are used in physics for determining the path of a particle in 3-dimensional space. When a high-energy nuclear particle travels through a gaseous medium within a chamber, it leaves a track of charge carriers (ions). A plane of wires disposed in the chamber produces an electric field to attract the charge carriers so produced. As the charge carriers approach the plane of wires, the intensity of the electric field increases the velocity of the charge carriers, causing charge multiplication (avalanching) and inducing current to flow in the wires. Electronics connected to the wires measures the current flowing in the wires with respect to time. The wires in the plane are formed into a grid to permit the x and y coordinates of the ionization events to be ascertained. The arrival time of the charge carriers at the plane of wires determines the position of the ion track in the z coordinate direction. See, for example, "The Time Projection Chamber", American Institute of Physics Conference Proceedings No. 108 (New York 1984); U.S. Pat. No. 4,179,608 to Walenta (1979).

A serious drawback of conventional gas ionization radiography detectors is that the maximum resolution obtainable is limited to the distance between the electrodes establishing the electric field. As the electrode spacing is decreased, the detector uses radiation less efficiently (due to the higher ratio of electrode volume to detection volume) and detective quantum efficiency decreases. Moreover, minimum electrode spacing is limited by mechanical factors and in any event cannot be made less than the spacing necessary to ensure that no electrical arcing between electrodes occurs. Thus, high resolutions are presently difficult or impossible to obtain in practice with this type of detector.

Perhaps the major drawback of gas ionization radiography detectors, however, is their relatively slow recovery time. The time it takes for charge carriers formed on the side of the chamber opposite to the collection grid to drift through the chamber and reach the collection grid depends upon the size of the chamber, the ion mobility of the gas within the chamber, and the electric field intensity. Typically, it takes ionic charge carriers a few milliseconds to traverse the chamber and reach the collection grid. New ionization events occurring during this time period (which is relatively long on an atomic scale) cannot be distinguished from an earlier event, and will cause erroneous results. For this reason, radiation sources are often operated in the pulse mode with times between pulses greater than the time required for charge carriers to completely traverse the chamber. See, for example, U.S. Pat. No. 4,301,368 to Riihimaki (1981) (proportional mode gas ionization chamber). Even in pulse mode operation, it is not possible to distinguish between plural ionization events occurring closely together in time in the same detection element.

Moreover, charge carriers located anywhere in an ionization chamber continuously induce a charge on the collection electrode of the chamber while they are drifting toward the electrode. Consider the formation of a single ion pair somewhere in an ionization chamber. Under the influence of the electric field, the positive ion and the electron (e$^-$) separate, each drifting towards an oppositely-charged electrode. One might believe that when a charged particle arrives on the collector plate, the potential of the collector plate changes by $-e/C$ (where C is the total capacitance of the collector plate). This view is not correct, however, because it neglects the induction effects which the two ions have been exerting on both plates since the time of creation of the ion pair.

At time t after the ion pair is formed, the positive and negative charge carriers induce charges $-q_+(t)$ and $-q_-(t)$ on the positive electrode. The potential P(t) of the positive electrode, originally zero, becomes $$P(t) = \frac{q_+(t) + q_-(t)}{C} \qquad (1)$$

(assuming the time constant of the electrode is long compared to t). The charge induced on the other electrode of an infinite two-electrode system is complementary. The current pulses flowing in the two electrodes are thus identical in shape and amplitude although different in sign.

At the instant of formation of the ion pair, the following relation must hold true:

$$q_-(0) = -q_+(0), \qquad (2)$$

so that $$P(0) = 0 \qquad (3)$$

When the negative ion is collected at time $t_1$, all of its charge must be induced on the collection electrode. Therefore, $$q_-(t_1) = -e \qquad (4)$$

(assuming the negative ion is collected first). At the instant when the simple view would suggest that the potential of the positive electrode should be $-e/C$, it is thus actually $$P(t_1) = \frac{-e + q_+(t_1)}{C}. \qquad (5)$$

At time $t_2 > t_1$, when the positive ion is collected, $q_+(t_2) = 0$, so $$P(t_2) = -e/C \qquad (6)$$

Similar effects are observed on the negative electrode.

Thus, the effect of an ionization event in an ionization chamber is completed only after collection of all of the ions, both positive and negative. More importantly, there is no sudden change of potential upon collection of ions, but rather, an increasing amount of charge is smoothly induced on the plates as the positive and negative ions approach the plates. See Wilkinson, *Ionization Chambers and Counters* §4.2, 59–62 (Cambridge Press 1950).

The desirability of having an ionization chamber in which the output pulse does not depend on the position of uncollected ions in the chamber was recognized long ago. One way to accomplish this result is to place a grid of parallel wires having a spacing ξ (axis to axis) with wire radius r a distance c from the electron collection electrode of the ionization chamber and a distance a from the other electrode in the chamber. Consider now an ion pair formed a distance b from the plane of the grid. The charge induced on the electron collection electrode is no longer $$\frac{-e(a-b)}{(a+c)} \qquad (7)$$

as in the no-grid case, since some of the lines of force produced by the ions finish on the grid instead of on the collection plate. Thus, the electron collection electrode is shielded from the effect of the positive ions. The electron proceeds to the electron collection plate (assuming it is not collected by the grid) and finally produces a charge on the collection plate when it is collected.

Such a grid shields the collection electrode from the effects of charged particles between the grid and the other electrode. Grid shielding efficiency depends on r (the radius of the grid wires), ξ (the wire spacing), and c (the distance from the grid to the shielded collection electrode).

Charged particles traveling between the grid and the collection electrode induce on the collection electrode a charge equal to their own (i.e. there is a space between the grid and the collection electrode where no shielding action occurs). Nevertheless, vastly increased rise times of the pulses measured at the collection electrode have been observed in ionization chambers including such grids or similar shielding structures. See, e.g., Wilkinson at 74-77; Rossi et al, *Ionization Chambers and Counters: Experimental Techniques*, Chapter 3 at 31-71 (McGraw-Hill 1949); Bunemann et al, "Design of Grid Ionization Chambers", A27 *Can. Journal of Research* 191-206 (1949); O. R. Frisch, Unpublished Report BR-49 (British Atomic Energy Project); and U.S. Pat. No. 4,047,040 to Houston (1977).

Gridded ionization chambers are presently in wide use for many applications involving detection and/or identification of charged particles. For instance, U.S. Pat. No. 4,150,290 to Erskine et al (1979) discloses a gridded ionization chamber adapted for detecting the energy, loss of energy per unit distance and angle of incidence of heavy ions. Butz-Jørgensen et al, "Investigation Of Fission Layers For Precise Fission Cross-Section Measurements With A Gridded Ionization Chamber", 86 *Nuclear Science And Engineering* 10-21 (1984) teaches using an ionization chamber with a Frisch grid to determine both the energy and the emission angle of charged particles emitted from a source positioned coplanar with the cathode of the chamber. Asselineau et al, "Performance of a Bragg Curve Detector For Heavy Ion Identification", 204 *Nuclear Instruments and Methods* 109-15 (1982) discloses an ionization chamber which continuously samples the ionization along the track left by an entering ion (the sampling being achieved in a short section of the detector defined by a Frisch grid). The atomic number and energy of high energy heavy ions stopping in the ionization chamber are determined by Bragg curve spectroscopy. See also Hotzl et al, "Experiences With Large-Area Frisch Grid Chambers In Low-Level Alpha Spectrometry", 22 *Nuclear Instruments and Methods In Physics Research* 290-94 (1981) (the use of parallel-plate gridded ionization chambers for alpha spectrometry). Zurmuhle et al, 203 *Nuclear Instruments and Methods* 261-67 (1982) discloses a heavy ion charged particle telescope using gas ionization chambers with and without Frisch Grids as Δ-E counters. See also Berceanu et al, "Detection And Identification of Heavy Ions at 180° Using a Proportional ΔE-E Chamber", 35 *Stud. And Cercet. Fiz.* No. 5, 503-505 (Rumania 1983) (cylindrical ionization chamber with Frisch Grid used as a proportional ΔE-E Chamber to measure specific energy loss and residual energy of heavy ions).

Other applications of gas ionization chambers include those described in U.S. Pat. No. 4,378,499 to Spangler et al (1983) (ion mobility detectors), U.S. Pat. No. 4,239,967 to Carr et al (1980) (trace water measurement) and U.S. Pat. No. 4,311,908 to Goulianos et al (1982) (gel electrophoresis). Ionization chambers are useful in almost any application wherein some property of an ionization event is to be determined, observed, or measured.

SUMMARY OF THE INVENTION

The present invention fixes the position of drifting secondary energy with respect to a source of propagating energy capable of producing secondary energy emissions. In accordance with the present invention, secondary energy is produced in a medium in response to radiation incident on the medium. The position of the secondary energy with respect to the medium is changed in a non-random manner. The position of the medium is changed synchronously with the change in position of the secondary energy. More particularly, the position of the medium is preferably changed in a direction opposite to the direction of motion of the secondary energy at a velocity equal in magnitude to the velocity of the secondary energy. The secondary energy therefore remains stationary with respect to the radiation even though the secondary energy is in motion with respect to the medium.

In accordance with another aspect of the present invention, charge integration is performed by continuously directing radiation along a path passing through a medium. The medium produces charge carriers along the path in response to the radiation. The charge carriers are maintained in proximity to the path and are prevented from recombining with the medium. The amount of charge in proximity to the path is measured.

In accordance with yet another aspect of the present invention, information is stored in a medium by selectively producing charge carriers in the medium. The charge carriers are prevented from recombining with the medium. The medium is displaced, and charge carriers entering a predetermined portion of the medium are detected.

In accordance with a further aspect of the present invention, the spatial distribution and intensity of radiation is determined. A chamber containing a medium defines a window admitting radiation into the chamber. Radiation admitted into the chamber produces charge carriers (ion-electron or electron-hole pairs) in the medium. A first electrically conductive electrode disposed within the chamber defines a first substantially planar surface contacting the medium. Plural respective electrically conductive collection electrodes disposed in the chamber each define a substantially planar surface in contact with the medium. The planar surfaces of the plural collection electrodes lie in a common plane disposed a fixed distance from the first surface.

A uniform electric field is produced between the first electrode and the plane of the collection electrodes, the direction of the field being substantially perpendicular to the path of the radiation admitted into the chamber. The electric field causes charge carriers between the first electrode and the plane to drift toward the plane at a substantially constant drift velocity $v_{drift}$. A chamber moving device mechanically coupled to the chamber moves the chamber in a direction opposite to the direction of drift of the charges at a constant velocity $v_{scan}$ of a magnitude substantially equal to the magnitude of $v_{drift}$. The currents flowing in the plural collection electrodes resulting from charges produced on the collection electrodes by the charge carriers is sensed. The spatial distribution in two dimensions of the radiation admitted into the chamber is determined in response to the amplitude with respect to time of the sensed currents flowing in the respective plural collection plates.

A source may continuously produce the radiation, and a collimator may collimate the radiation into a beam. A device operatively coupled to the collimator may maintain the direction of the beam perpendicular to the direction of the electric field within the chamber. The collimator may be moved together with the chamber by the chamber moving device. The chamber may be moved along a circle having its center located at the radiation source.

In accordance with yet another feature of the present invention, the drift velocity $v_{drift}$ of the charge carriers in the medium may be selected. Drift velocity selection can be performed by adjusting the intensity of the electric field, adjusting the density (e.g. pressure) of the medium, and/or introducing impurities into the medium.

In accordance with yet another feature of the invention, distortions in the electric field in proximity to the front and/or rear walls of the chamber are corrected by disposing a structure on the surface of the walls within the chamber which forces a constant potential gradient to exist in proximity to the walls. The structure may include, e.g., a sheet of resistive material, or plural electrically conductive strips connected to plural voltages produced by a voltage divider.

In accordance with yet another feature of the present invention, one of the first and second electrodes may define a tilted and/or curved surface.

In accordance with the present invention, a detector which mechanically and electronically is essentially one-dimensional is operated in a mode permitting it to behave like a two-dimensional detector. Detectors in accordance with the present invention can have high spatial resolution in two directions as well as high detective quantum efficiency.

A one-to-one correspondence is created in the present invention between a spatial coordinate line in the direction of motion of the detector and the time when the signal collection volume intersects that line. Temporal integration of incident energy (e.g., to reduce noise) is possible while at the same time maintaining spatial coherence. High resolution detection of incident energy is obtainable in the present invention, since the energy is integrated using static secondary energy (e.g. particles), thereby reducing or eliminating motion blurring. Additionally, the present invention provides lower quantum noise in the detected output signal (i.e. higher detective quantum efficiency) because the detection medium may be continuous, and, if necessary, relatively deep (i.e., have high radiation absorption) in the direction of the incident radiation. Because the present invention permits continuous detection of radiation intensity in the detector scanning direction (and possibly also in a direction perpendicular to the scanning direction), it is possible to select the output sampling rate (and thus, the spatial resolution of the detector) largely independently of detector physical dimensions. Moreover, a detector in accordance with the present invention is relatively simple in construction and can be manufactured at reduced cost, since the detector has an effective dimensionality which is one less than that of the information being detected. Based on the ranges of available charge mobilities, diffusion lengths and electron stopping distances in typical x-ray detecting media, it appears that charge detectors in accordance with the present invention have parameters useful for a wide variety of different applications including but certainly not limited to digital radiography and computed tomography.

BRIEF DESCRIPTION OF THE DRAWINGS

These and other features of the present invention will be more completely appreciated by reading the following detailed description taken in conjunction with the accompanying drawings, of which:

FIG. 2 is a schematic illustration of a prior-art scanning fan beam digital radiography system;

FIGS. 4A and 4B are schematic diagrams of a presently preferred exemplary embodiment of a charge detector in accordance with the present invention;

FIGS. 5A, 5B and 5C are schematic diagrams of charge integration over time in the detector shown in FIGS. 4A and 4B;

FIGS. 6A and 6B are schematic illustrations of a scanned radiography system in accordance with the present invention, the system using the detector shown in FIGS. 4A and 4B;

DETAILED DESCRIPTION OF PREFERRED EMBODIMENTS

Figure 1:
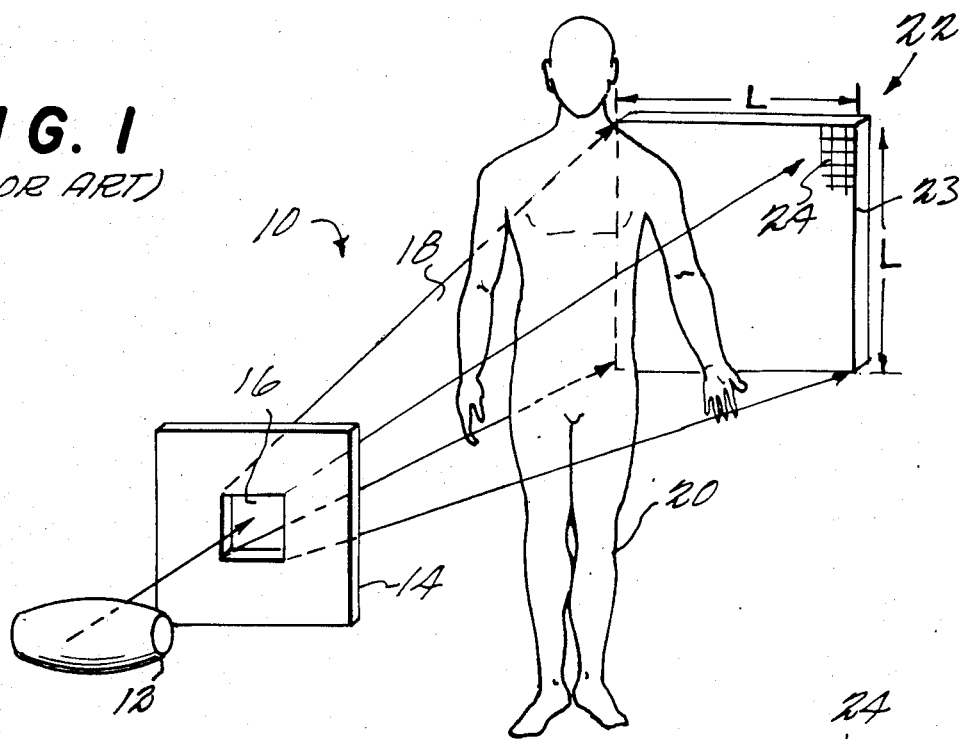
FIG. 1 is a schematic diagram of a prior-art wide-area beam digital radiography system showing the relationship of effective detecting elements of a detector array to the field-of-view.
Figure 1A:
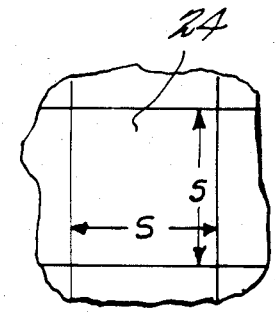
FIG. 1A is a detailed schematic view in plan of a detecting element of the detector array shown in FIG. 1.
Figure 3:
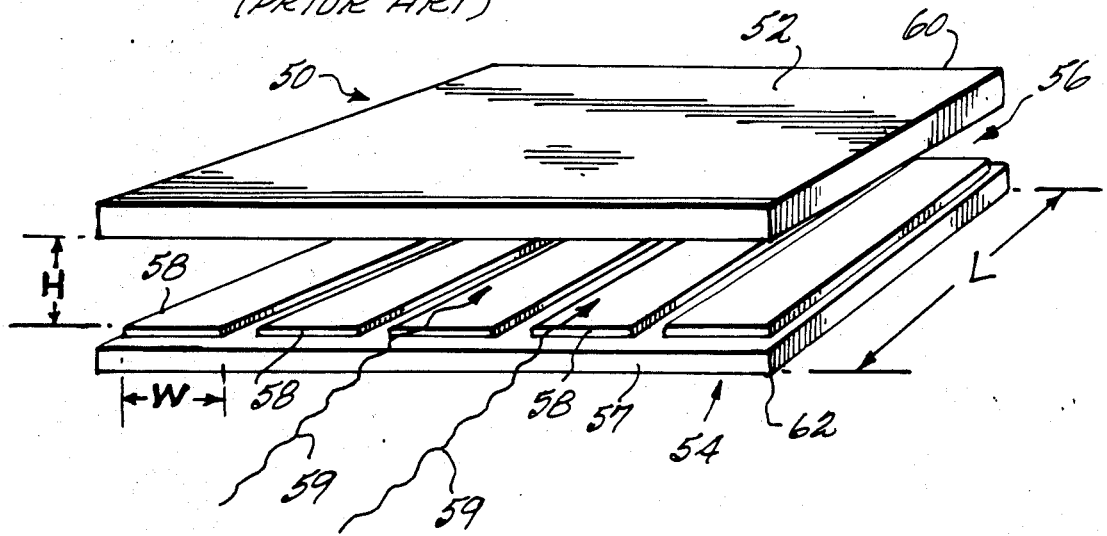
FIG. 3 is a side elevated perspective view of a prior-art xenon ionization detector of the type used for scanned digital radiography.

FIGS. 4A and 4B are schematic diagrams of a presently preferred exemplary embodiment of a detector 100 in accordance with the present invention. Detector 100 comprises a radiation detection volume 102 and a signal collection volume 104. X-radiation detection volume 102 is continuous in the preferred embodiment, although it might comprise discrete elements if desired. Signal collection volume 104 in the preferred embodiment contains a plurality of discrete collection elements 106 arranged in a linear array along an x-coordinate axis (although a continuous medium operatively connected to a scanning detection device or other read-out device could be used if desired).

A source of propagating (e.g. radiant) energy (not shown) directs radiant energy toward detector 100 along a plurality of paths such as path 108 into detection volume 102 to produce secondary energy in the portion of detection volume along the path. Any form of radiation can be used in accordance with the present invention, as can any form of secondary energy produced thereby. For instance, the radiation incident to detection volume 102 could comprise electromagnetic radiation of virtually any wavelength (e.g. x-ray, ultraviolet, visible, infrared, microwave, hf, vhf or uhf wavelengths), charged or neutral particle beams (e.g. electrons, protons, neutrons), acoustic waves, etc. The secondary energy produced in detection volume 102 by the radiation incident to the detection volume may also be of any form, such as charged particles (including positive and negative ions, electron-hole pairs or other particles) or acoustic waves, etc. In the presently preferred exemplary embodiment, the form of radiation used is x-radiation and the form of secondary energy produced thereby in detection volume 102 is electron-ion pairs (charge carriers) produced by ionization. However, the present invention is by no means limited to any particular form of radiation and secondary energy.

Path 108 in the preferred embodiment is parallel to a y coordinate axis perpendicular to the x coordinate axis. Detection volume 102 in the preferred embodiment contains an ionizable medium. The radiation passing through detection volume 102 interacts with the medium in detection volume 102 in a well-known manner in the preferred embodiment to produce charge pairs (i.e. positive and negative charge carriers). For example, a typical 100 keV x-ray photon may produce about 2,000 charge pairs, forming a cloud 110 of charged particles.

Ordinarily, the charge pairs in cloud 110 would recombine soon after they are produced due to their mutual electrostatic attraction. However, a uniform constant electric field 112 (produced by electrodes or the like, not shown) exists across detection volume 102. The lines of force of the electric field are parallel to a z coordinate axis orthogonal to the x and y coordinate axes. The direction of the electric field is toward collection volume 104. Electric field 112 imparts a constant drift velocity to the charged particles in cloud 110, causing charges of one sign to drift in a cloud 114 toward signal collection volume 104 (i.e. along the z direction) at a constant drift velocity $v_{drift}$. Because the electric field 112 is constant and uniform and is directed in the z direction, charge cloud 114 moves in the z direction with substantially no x or y direction components. Liberated charges of the other sign drift in a direction away from collection volume 104 and do not contribute to the output signals produced by detector 100. Because the positive charge carriers drift in a direction opposite to the direction of drift of the negative charge carriers, the charge pairs do not have a chance to recombine to any great extent either upon creation (since the electric field immediately begins acting on the carriers) or after the carriers begin to drift (volume recombination).

Detector 100 is physically moved with respect to path 108 at a velocity $V_{scan}$ having a magnitude equal to that of the velocity $v_{drift}$ at which the charge carriers in cloud 114 are drifting. In the preferred embodiment, the direction in which detector 100 is moved is in the z direction opposite to the direction in which cloud 114 is drifting (and is thus perpendicular to the direction of path 108 of the incoming x-ray beam) and has the effect of making the drifting charges stationary with respect to path 108. The charge carriers drift with respect to the detector 100 at a constant velocity, and detector 100 is synchronously moved in a manner exactly opposite to the manner in which the charge carriers drift. Therefore, the charge carriers remain stationary with respect to path 108 for as long as the path intersects detection volume 102. All x-ray photons traveling along path 108 contribute to charges in proximity to the path.

Hence, detector 100 is moved in any translational, rotational or combined (i.e. movement with both translational and rotational components) manner to match the motion of the secondary energy may be modified (by, e.g., uniform or nonuniform electric and/or magnetic fields, acoustically uniform or nonuniform media, etc. from other energy forms), and the movement of detector 100 may be matched to the movement of the secondary energy as modified.

As described above, charge cloud 114 moves with respect to the reference frame of detector 100. However, in accordance with the present invention, detector 100 is moved in a manner exactly opposite to the movement of charge cloud 114. Therefore, charge cloud 114 is stationary with respect to path 108 of the x-rays. This phenomenon is best understood from FIGS. 5A, 5B and 5C, which are graphical illustrations of a side view at different points in time of the y-z plane passing through detector 100 which contains path 108. FIG. 5A shows the charge clouds in proximity to path 108 at a time $t=t_1$. At time $t_1$, only one charge cloud 114 has been formed. FIG. 5B shows the charge clouds in proximity to path 108 at a time $t=t_2>t_1$. At time $t_2$, detector 100 has moved a distance $d_z$ in the z direction while charge cloud 114 has moved the same distance $d_z$ in the opposite z direction. The result is that charge cloud 114 is stationary with respect to path 108. Moreover, because an x-rays have continuously travelled along path 108 during time $t_1>t>t_2$, additional charge clouds 114a, 114b etc. are also formed along path 108.

FIG. 5C is a schematic illustration of the position of charge cloud 114 at a time $t=t_3>t_2>t_1$. Because x-rays have continuously travelled along path 108, additional charge clouds 114d, 114e, 114f, etc. have been formed in proximity to path 108. The original charge cloud 114 is still in proximity to path 108 because the distance it has moved with respect to detector 100 is equal and opposite to the distance detector 100 has moved with respect to path 108. Thus, all x-ray photons incident along path 108 contribute to a charge in proximity to the path, which has been integrated over the time $t_1$ to $t_3$. The signal produced by detection volume 104 when charge clouds 114, 114a, 114b, etc. are incident on the collection volume (i.e. when detector 100 translates or otherwise moves to a position in the z direction where path 108 intersects collection volume 104) is proportional to the integral of the intensity of x-radiation directed along path 108 from the time path 108 first intersects detection volume 102 (i.e., $t=t_0<t_1$) to the time collection volume 104 intersects the path.

FIG. 4B is a graphical illustration of the drift of the cloud 114 of charge carriers toward collection volume 104 under the influence of electric field 112. The motion of cloud 114 is depicted with respect to the reference frame of the detector 100. Although the individual particles in cloud 114 are moving in various directions due to thermal agitation and diffusion (as will be explained), the effect of this movement can be neglected if the proper conditions exist. Electric field 112 causes the charge carriers in cloud 114 to collectively move toward collection volume 104 with a constant drift velocity. Because the direction of electric field 112 in the preferred embodiment is in the z direction perpendicular to the direction of path 108 of the x-rays (the y direction), cloud 114 moves along a linear path parallel to the z coordinate axis toward collection volume 104 and is detected by one of discrete collection elements 106. In the preferred embodiment, each of collection elements 106 is so much larger than cloud 114 that the cloud will generally be incident on only one of the elements.

Current flow is induced in one of elements 106 on which cloud 114 is incident when collection volume 102 contacts cloud 114. Elements 106 each produce an output signal proportional to the amplitude of the current flowing in them. Collection volume 104 thus produces a spatially discrete set of N signals continuously in time, the amplitude of each of the signals indicating the number of charge clouds 114 incident to the respective collection element 106 which produced the signal. The output signals produced by collection volume 104 may be sampled, amplified, digitized and analyzed using conventional techniques.

Herein, the longitudinal direction of detector 100 is referred to as the x direction, the direction of path 108 is referred to as the y direction, and the direction in which detector 100 is moved is referred to as the z (i.e., scanning) direction, where the x, y, z directions are all orthogonal. The electric field also extends in the (negative) z direction in the preferred embodiment.

Because the electric field has a direction perpendicular to the x direction, each of collection elements 106 is sensitive only to ionization events occurring in the area of detection volume 102 having the same range of x coordinates as the detection volume. In other words, a collection element 106 having a width W disposed in collection volume 104 at the position $x = x_1$ to $x = x_1 + W$ is sensitive to all ionization events occurring in the slab of detection volume 102 ranging anywhere in the y and z direction and having an x coordinate value between $x = x_1$ to $x = x_1 + W$.

The temporal response of the output current $dQ/dt$ of each of elements 106 of collection volume 104 is proportional to the spatial distribution of charge clouds 114 in the z direction ($dI/dz$). The spatial distribution of charge clouds 114 in the z direction is, in turn, determined directly by the spatial distribution of x-ray intensity passing through detection volume 102. The above relationships can be summarized by the following relation:

$$dQ(t;x)/dt = k \cdot dI(z;x)/dz \quad (8)$$

where $$t = t_0 + (z - z_0)/v. \quad (9)$$

The values $t_0$ and $z_0$ are the time t and position z, respectively, at which data collection commences, and v is both the scanning velocity $v_{scan}$ and the charge carrier drift velocity $v_{drift}$.

The output current $dQ/dt$ of each of elements 106 is sampled in time by conventional electronics (such as a data acquisition system). If the output sampling period is $\tau$, then the signal $dQ/dt$ is integrated over the period $\tau$. The sampling period $\tau$ therefore corresponds to a spatial resolution element in the z direction. In this way, spatial resolution in the z direction of detector 100 can be selected simply by selecting the sampling period $\tau$ of the outputs of collection elements 106. If the spatial resolution element corresponding to the sampling period $\tau$ is m times smaller than the extent of detection volume 102 in the z direction, detector 100 functions as an n-by-m element array. The total x-ray integration time is equal to the time a fixed path 108 is first incident upon detection volume 102 to the time path 108 leaves the detection volume as detector 100 is moved in the z direction, and is therefore not dependent upon the output signal sampling period $\tau$. Hence, while the total x-ray integration time is determined by the dimensions of detection volume 102 in the z direction and the velocity $V_{scan}$, the spatial resolution in the z direction of detector 100 is independent of the height of the detection volume and is determined solely by the product of the scan velocity $V_{scan}$ and the output signal sampling period $\tau$ (if diffusion is neglected).

The condition in which moving (kinetic) charges in the reference frame of detector 100 become stationary (static) in the laboratory frame is termed the "kinestatic" condition. Detector 100 operating under the "kinestatic" condition is called a "kinestatic charge detector".

Operation of detector 100 in the above-described mode provides several advantages. The longitudinal spatial coordinate (i.e. z, or scan direction) of detector 100 is in one-to-one correspondence with the output signal time coordinate. That is, the integrated x-ray intensity incident to any x-y plane in detection volume 102 determines the output signal amplitude at the time collection volume 104 passes through that plane. This is because charges remain fixed in space and are detected only when collection volume 104 "sweeps through" the fixed position of the charges.

Another very important advantage of the present invention is that detector 100 can be used to integrate x-ray signals over time periods much longer than the output sampling period. This is because charge integration continuously occurs along a path 108 for the entire time detection volume 102 contains the path. This advantage results in reduced x-radiation noise without sacrificing high temporal (i.e. spatial) resolution. For example, it would be possible to sample the output signals every 250 microseconds (corresponding to a very small spatial element width in the z direction) while integrating charges for 16 milliseconds (the integration time being determined by the velocity $v_{scan}$ at which detector 100 is moved and the extent of the detector in the z direction) to produce a signal corresponding to 64 single lines of data (i.e., m = 64).

Moreover, because the signal image accumulates on static charges, detector motion blurring is completely eliminated. In prior art scanning detector systems, movement of the effective detection element during the signal integration period produces blurred signals and degraded image modulation transfer functions.

In addition, detector 100 permits any spatial resolution in the z direction to be chosen simply by choosing the scan velocity $V_{scan}$ and the sampling period $\tau$ of the output signals. Moreover, spatial resolution in the z direction is completely independent of the width of detector 100 in the z direction. Of course, at sufficiently high sampling rates there are limitations on the maximum spatial resolution obtainable (such as those imposed by intrinsic resolution, x-radiation photon noise and noise generated by the electronic circuits connected to collection elements 106).

FIGS. 6A and 6B show the presently preferred exemplary embodiment of a scanned digital radiography system 200 in accordance with the present invention. System 200 includes a source 202 of x-radiation, a collimator 204, detector 100 and a means for moving collimator 204 and detector 100 together. The means for moving collimator 204 and detector 100 in the preferred embodiment comprises an arm 206 rotatable about the focal point of source 202 which supports both collimator 204 and the detector 100.

Source 202 produces x-rays and directs the x-rays generally toward collimator 204 (source 202 may comprise a conventional omni-directional x-ray tube or the like). Collimator 204 defines an aperture 206 which focuses the x-rays into a fan beam 210 directed toward an object 208 to be imaged. In the preferred embodiment, the thickness of fan beam 210 is made to be equal to the height in the z direction of the detection volume 102 of detector 100 in order to avoid exposing an object 208 to be imaged to x-rays which could not become incident to the detector.

Object 208 to be imaged is interposed between collimator 204 and detector 100 in the path of beam 210. For purposes of explanation, object 208 is shown in FIGS. 6A and 6B as comprising an infinite sheet of material impenetrable by x-radiation in which is defined a single pin-hole 212 radial to source 202. Thus, the only x-rays penetrating object 208 are directed along a single rectilinear path 108 along a radius of source 202 toward detector 100.

FIG. 6A shows the position of collimator 204 and detector 100 with respect to stationary object 208 and source 202 at a time $t=t_1$. At time $t_1$, path 108 is incident to and penetrates through detection volume 102 of detector 100, producing a line 214 of charge clouds in the detection volume. Beam 210 is continuously directed toward object 208, so that radiation is likewise continuously directed along path 108 toward and through detector 100. Meanwhile, arm 206 is continuously rotated about the focal point of source 202, causing collimator 204 and detector 100 to move (rotate and/or translate) together through space along concentric circles having their centers at the focal point of the source. Because collimator 204 and detector 100 are stationary with respect to one another, beam 210 is always directed toward detector 100. The direction in which detector 100 is moved is instantaneously perpendicular to a line 215 parallel to the boundary between collection volume 104 and detection volume 102 and intersecting the focal point of source 202.

FIG. 6B shows the position of collimator 204 and detector 100 at a time $t=t_2>t_1$. At time $t_2$, detector 100 has moved (rotated and/or translated) with respect to path 108 to a point where the path is nearly incident to collection volume 104 of the detector. Charges have been collecting along line 214 since path 108 was first incident on detector 100 (i.e., the charges have integrated over time since path 108 first entered detection volume 102, and the number of charge clouds in proximity to line 214 is proportional to the total intensity over time of the x-radiation directed along path 108). As detector 100 continues to move, collection volume 104 finally intersects with and sweeps up the charges along line 214, and produces a signal the amplitude of which is proportional to the total charge accumulated along the line. Because of the orientation of collection volume 104 with respect to a radius of source 202, line 214 is parallel to the collection volume at the instant the charges along the line are swept up by the collection volume (even though at, for instance, time $t_1$, the collection volume is not parallel to the line). In this way, all of the charges in proximity to line 214 are swept up by collection volume 104 at exactly the same instant in time (provided precautions are taken to ensure that charges in detection volume 102 further away from the focal point of source 202 are forced to become kinestatic concurrently with charges in the detection volume closer to the focal point, as will be explained).

FIGS. 7, 8A, 8B, 9 and 10 show the use of radiography system 200 to image an object 216 comprising a planar sheet in which a pattern 218 is defined. Pattern 218 comprises a square opening 220 about which are arranged four square indentations 222a–222d. Object 216 comprises a very dense material (e.g. tin) which absorbs nearly all x-radiation incident on it and permits virtually no x-radiation to pass through it except that radiation incident on pattern 218. Opening 220 permits x-radiation to pass freely through, while indentations 222a–222d are of intermediate, equal thickness and permit some but not all of the x-rays incident thereon to pass through object 216.

Figure 8A:
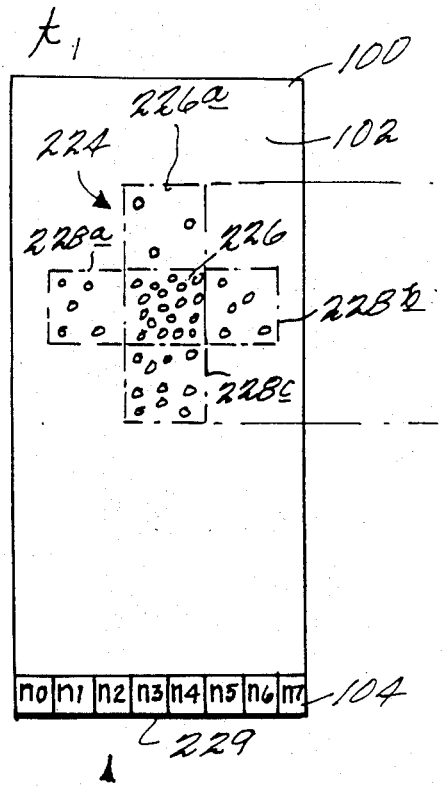
FIGS. 8A and 8B are schematic illustrations of detection by the detector shown in FIGS. 4A and 4B of x-radiation passing through the object shown in FIG. 7.
Figure 8B:
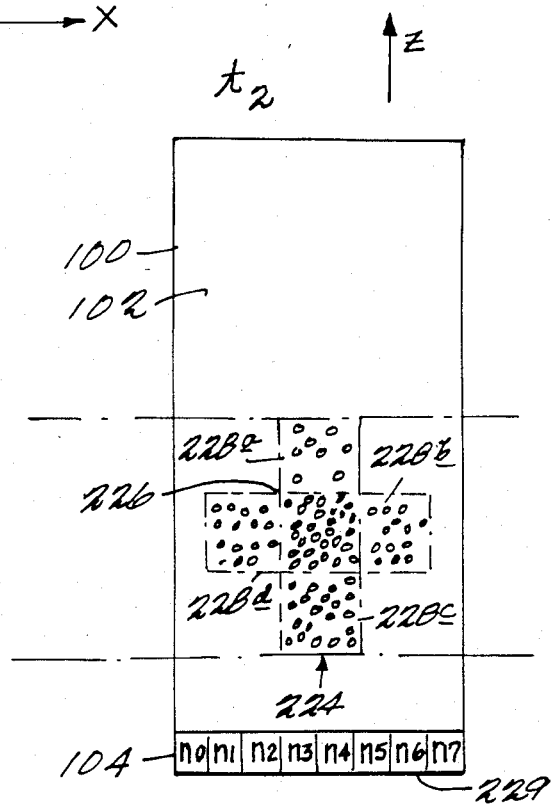

If object 216 is substituted for the object 208 shown in FIGS. 6A and 6B, detector 100 detects the x-radiation passing through object 216. FIG. 8A schematically illustrates the charges produced in detection volume 102 of detector 100 (detector 100 being shown as viewed from source 202) at a time $t=t_1$, while FIG. 8B shows the charges accumulated in detection volume 102 at a time $t=t_2>t_1$. Charges accumulate only in an area (volume) 224 of detection volume 102 having an outline of pattern 218 because x-radiation does not pass through any portion of object 216 other than the pattern. Area 224 includes a square area 226 corresponding to opening 220 of object 216, in which relatively large amounts of charge accumulate (because of the high transmissivity of opening 220), and square areas 228a–228d corresponding respectively to indentations 222a–222d, in which intermediate amounts of charge accumulate (due to the intermediate transmissivity of the indentations).

At time $t=t_1$, area 226 contains a relatively high charge proportional to the time radiation passing through opening 220 has been incident on the area and the intensity of source 202. Area 228c also contains a relatively high charge because, even though indentation 222c does not have a very high transmissivity, the radiation passing through indentation 222c has been falling on area 228c since detector 100 first intersected the radiation passing through pattern 218 (for the same reason, a charge gradient will exist in each of areas 226 and 228a–228d with the portions of the areas nearest collection volume 104 containing more charge than the portions of the areas farther away from the collection volume). Areas 228b and 228d contain approximately equal amounts of charge since the same amount of radiation is incident to each of them and has been incident to each for the same period of time. Area 222a contains a relatively small amount of charge because, even though approximately equal amounts of radiation are incident on each of areas 222a–222d, area 222a has been exposed to the radiation for only a relatively short period of time.

FIG. 8B shows the charge distribution in detector 100 at time $t=t_2>t_1$. By time $t_2$, a large amount of charge has collected in area 226. Likewise, more charge has built up in each of areas 228a–228d because of the relatively long time these areas have been exposed to radiation. Area 228c has been exposed to radiation for the longest period of time; however, the charge present in area 228c is less than the charge present in area 226 because of the relatively low transmissivity of indentation 222c as compared with that of opening 220 (the amount of charge present in a particular area of detection volume 102 is proportional to both the intensity of the x-rays incident on that area and the amount of time the area has been exposed to the radiation). Area 224 does not move in space from time $t_1$ to time $t_2$, but rather, detector 100 moves with respect to the area. Area 224 remains stationary with respect to stationary object 216 being imaged.

Figure 9:
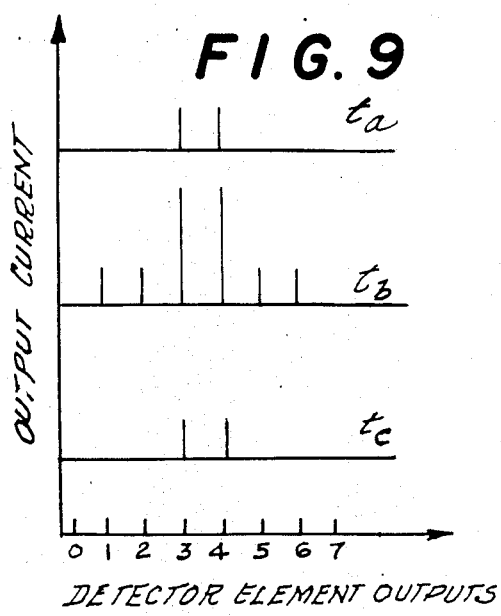
FIG. 9 is a graphical illustration of electrical signals resulting from the detection shown in FIGS. 8A and 8B.

For ease of explanation, the detector shown in FIGS. 8A and 8B has a collection volume divided into only eight collection elements 229 (n1–n8), providing a spatial resolution in the x direction of eight lines per the width of the detector (in the preferred embodiment higher resolution than this is desired, so more collection elements per unit length are used). FIG. 9 shows the output of collection elements 229 with respect to time as detector 100 is scanned in the z direction. At time $t=t_a$, area 228c is in contact with collection volume 104. Because elements n3 and n4 are substantially in contact with area 228c while the remainder of the elements are not in registry with area 224, only detectors n3 and n4 produce an output signal. The output signals produced by elements n3 and n4 at time $t_a$ is proportional to the charge collected in area 228c.

At a time $t=t_b>t_a$, detector 100 has moved further in the z direction so that areas 226, 228b and 228d are in contact with collection volume 104. Detectors n3 and n4 are in contact with area 226 which, as described above, contains a large amount of charge. Therefore, the output of elements n3 and n4 is relatively high. Elements n1 and n2 are in contact with area 228d, while elements n5 and n6 are in contact with area 228b. Areas 228d and 228b contain approximately equal amounts of charge, so that elements n1, n2, n5 and n6 produce outputs each having substantially the same amplitude. At time $t_b$, the output of elements n1, n2, n5 and n6 are approximately equal to the output of elements n3 and n4 at time $t_a$ because the radiation intensity incident on areas 228b, 228c and 228d is the same.

At time $t=t_c>t_b$, detector 100 has moved still further in the z direction, so that area 228a is in contact with collection volume 104. Although the charge collected in area 228a was substantially less than the charge collected in the area 228c at time $t_a$ (as shown in FIG. 8B), the charge collected in area 228a at time $t_c$ is approximately equal to the charge collected in area 228c at time $t_a$ (since charge is integrated in area 228a during the time $t_a<t<t_c$). Thus, the outputs of elements n3 and n4 at time $t_c$ are approximately equal to the outputs of elements n1, n2, n5 and n6 at time $t_b$ and are approximately equal to the outputs of elements n3 and n4 at time $t_a$.

In the preferred embodiment, the outputs of collection elements 229 are applied to a data acquisition system (not shown) which periodically samples the output of the elements. As discussed above, the sampling rate determines the resolution of system 200 in the z direction. For purposes of illustration, it will be assumed that the sampling period has been selected to be $(t_a-t_c)/6$ where $t_a$ is the time at which area 224 first contacts collection volume 104 and $t_c$ is the time at which the area 224 last contacts the collection volume. Under these circumstances, the spatial resolution in the z direction (as determined by the output sampling rate) is equal to the spatial resolution in the x direction (as determined by the number of collection elements 229 in detector 100). In other words, the "spatial elements" in the z direction (determined by the output signal sampling period of the output of collection elements 229) have widths which are equal to the widths of collection elements 229 in the x direction.

Figure 10:
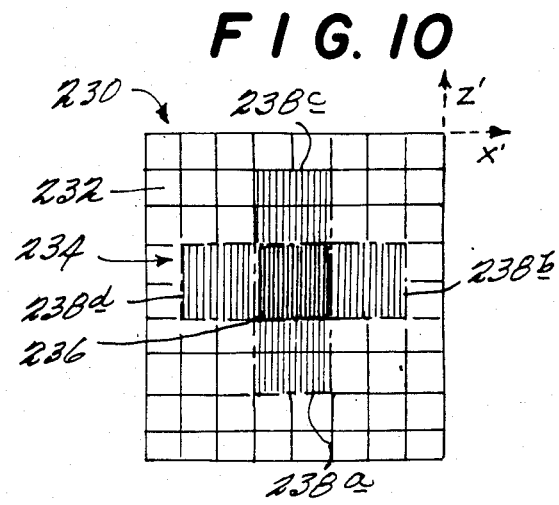
FIG. 10 is a diagrammatical illustration of an image produced by the detection procedure shown in FIGS. 8A and 8B.

After undergoing conventional image processing and enhancement, the output of the data acquisition system is displayed on a display 230 as shown in FIG. 10. Display 230 displays the image of object 216 in the z′- x′ coordinate system in image resolution elements 232 corresponding to the spatial resolution elements discussed above. The resulting image 234 comprises a square center area 236 which has an intensity corresponding to the intensity of x-radiation passing through opening 220 of object 216, and square areas 238a–238d having intensities corresponding to the intensity of x-radiation passing through indentations 222a–222d of the object. The remainder of display 230 has zero intensity because the remainder of object 216 has zero transmissivity to x-radiation.

As described above, in the present invention, detector 100 is translated in a direction opposite to the direction of drift of the charge carriers at a velocity $v_{scan}$ of a magnitude equal to the magnitude of the velocity $v_{drift}$ of the charge carriers. Detector 100 can be translated by any conventional mechanical or electro-mechanical device, such as a step motor operated under microprocessor control and connected to the arm shown schematically in FIGS. 6A and 6B via conventional mechanical gearing. In the preferred embodiment, the direction in which the charge carriers move is determined by the direction of the electric field. The velocity $v_{drift}$ at which the charge carriers move is determined by the electric field intensity and the charge carrier mobility. Thus, one of the conditions for proper operation of the preferred embodiment is that the electric field be constant and uniform and have a suitable intensity value.

If a sufficiently small electric field is applied across a medium, charge carriers in the medium will tend to drift along the electric field lines at a velocity proportional to the field intensity. This drift velocity is independent of the velocity of the carriers due to diffusion, and can be regarded as an additional velocity superimposed upon the entire collection of charge carriers in the medium. The electric field strength is sufficiently "small" when the energy imparted to the charge carriers by the electric field between collisions of the charge carriers is small compared to the thermal energy of the charge carriers. The maximum field strength which satisfies this criterion increases linearly with the density of the medium and is generally much higher for ions (positive charge carriers) than for electrons (negative charge carriers).

Absorption of incident radiation produces charge carrier pairs comprising negative and positive charge carriers. The charge production mechanism is relatively well understood. For instance, if the medium is xenon gas in which moderate energy x-radiation interacts, the most probable interaction process for the xenon and x-radiation is the photoelectric effect, in which a photoelectron is ejected from the inner shell of a xenon atom along with one or more fluorescent photons and Auger electrons. The photoelectrons and Auger electrons are relatively energetic, and therefore produce additional ion pairs with lower kinetic energy as they collide with additional molecules of the medium. The result is a cloud of charges the size of which depends upon the absorption of primary photons, electrons and scattered photons.

The densest concentration of charges arises from the photoelectrons knocked out of the atoms of the detector medium by an incident photon. These high-energy electrons cause secondary ionization as they lose energy. The distance a photoelectron travels depends on its initial energy and its specific energy loss, dE/dx, in the detection medium. The electrons do not travel in straight path as they lose energy but instead scatter in random directions after each collision. The effective range of a 50 keV electron is less than 0.1 millimeters for high pressure gases, liquids and solids.

Figure 11:
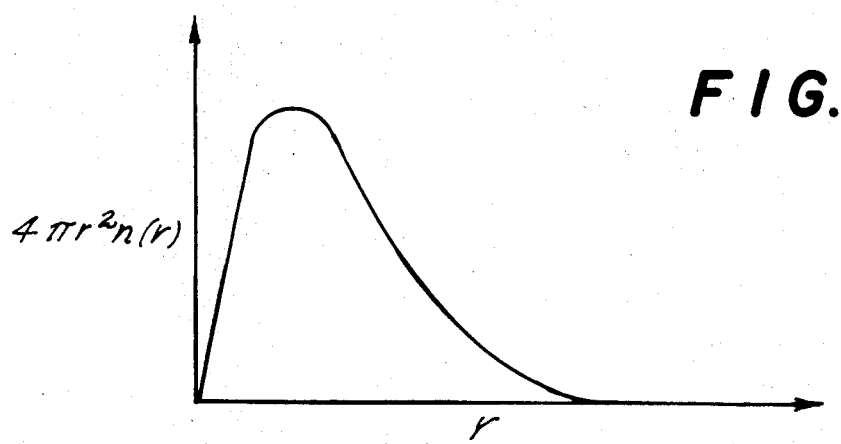
FIG. 11 is a graphical illustration of the radial spatial distribution of charge carriers produced by a single high-energy electron.

The charge cloud resulting from secondary ionization produced by a single high-energy electron is symmetric about the position of creation of the electron and is spherical in shape with a radial distribution such as that shown in FIG. 11. See, e.g., Rutt et al, "A Xenon Ionization Detector For Scanned Projection Radiography: Theoretical Considerations", Vol. 10, No. 3, *Med. Phys.* 284, 285 (1983). If the function n(r) is defined as the number of ion pairs produced per unit volume, $4\pi r^2 n(r)dr$ is the total number of charged pairs in the spherical shell of thickness dr at radius r. FIG. 11 is a plot of this total number as a function of radius r. As can be seen from FIG. 11, the number of charge carriers which are produced with respect to the site of creation of the photoelectron increases rapidly with r for small r values, reaches a maximum, and then falls off gradually for larger values of r.

Figure 12:
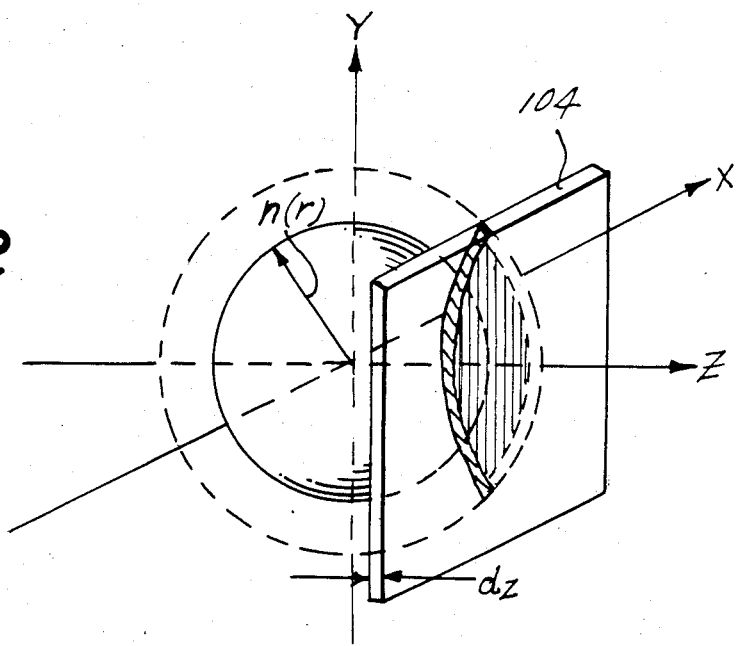
FIG. 12 is a graphical illustration of a charge cloud drifting in the z direction into a collection volume of the detector shown in FIGS. 4A and 4B.
Figure 7:
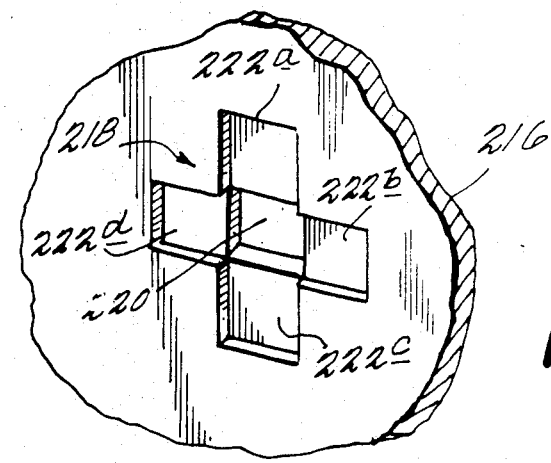
FIG. 7 is a side elevated view in perspective of an object to be imaged.

Once formed, the spherical cloud of charges drifts through the uniform electric field until it reaches the signal collection volume 104. The signal which arises from a spherical cloud of charge at an instant in time (e.g., z coordinate position of the detector 100) is the total amount of charge in an incremental slice dz of the collection volume 104. FIG. 12 is a graphical illustration of the amount of charge in such an incremental slice dz. This amount may be calculated easily in cylindrical coordinates for a particular medium given the radial distribution of the medium. Ideally, the majority of the signal should be collected in a time (i.e., z distance) shorter than that corresponding to the size of the desired resolution element in the z direction.

If the finite size of the charge cloud for each absorbed photon and the diffusion of charges from the cloud in the drift region are small compared to a resolution element, than the major loss of resolution is due to photons which are scattered in one volume element and absorbed in another (where a detection element is defined as a portion of detection volume 102 ionization events occurring in which will cause a signal to be produced by only one collection element 106). This scattering includes both Compton scattering and K-fluorescent photons. The secondary photons are absorbed in many different volume elements. Because of this scattering, a low frequency background is added to the output signal of detector 100, causing blurring of the image. The degree of image blurring depends on the x-radiation energy and the type of detection medium. The generation of secondary and scattered photons also gives rise to a loss in the signal from each volume element and thus decreases the detective quantum efficiency of detector 100 (i.e., the system converts radiation to signal less efficiently). The effect of secondary photons on spatial resolution and detective quantum efficiency depends on the atomic number and density of the medium and on the geometry of detection volume 102 and signal collection volume 104.

As is well known, particles will spread or scatter under the influence of a concentration gradient. Consider a fluid confined in a space of dimensions which are large compared to the mean free path of particles in the fluid. At constant temperature and in the absence of external forces, there will be a spontaneous movement (i.e., diffusion) of the particles in all directions to establish a uniform concentration of the particles in all parts of the enclosed space. As is well known, particles of a fluid are in constant motion in all directions as a result of their thermal agitation. Random motion causes particles in an area of higher concentration of the particles in the space to diffuse toward an area of lower concentration of the particles in the space.

When charge carriers are produced in the medium in detection volume 102, the thermal motion of the charge carriers causes them to diffuse from the site of creation. This diffusive motion is impeded by random collisions with the molecules of the medium itself. When the mean free path of the charges is short compared with the distances of interest, the behavior of a group of charges can be predicted using the diffusion equation $$N = -D\frac{dc}{dz,} \quad (10)$$

where N is the rate of diffusion, D is the diffusion coefficient, c is the concentration of the charge carriers in the space, and z is the distance in the direction of diffusion (of course, the charges will diffuse in all directions, not merely in the z direction). The diffusion coefficient D is a joint property of the charge carriers and the medium. The mean free path of molecules in a gas at atmospheric pressure is on the order of $0.1 \times 10^{-6}$ meters.

Hence, as clouds of charge carriers 114 drift through detection volume 102 of detector 100, there is diffusion of the individual charges away from the center of mass of the cloud. To achieve a desired detector resolution, this diffusion must be relatively small compared to the resolution element size of system 200.

The drift velocity, $v_{drift}$, of the charge carriers can be calculated from the ion mobility, $\mu$ and the electric field, E, according to the following relationship:

$$\vec{v}_{drift} = \mu \vec{E} \quad (11)$$

For small field intensities, the mobility of the charges is linearly related to the diffusion coefficient by the Einstein relation $$D = \mu kT/e, \quad (12)$$

where k is Boltzmann's constant, T is the temperature in degrees Kelvin, and e is the electronic charge. See McDaniel, *Collision Phenomena In Ionized Gases* (John Wiley & Sons 1964), the entire text of which is expressly incorporated herein by reference.

The root-mean-square (rms) displacement $\bar{z}$ of charges from the point of origin as a function of time t due to diffusion is $$\bar{z} = (4Dt/\pi)^{\frac{1}{2}}. \quad (13)$$

The time needed for the charges to drift from one side of detection volume 102 to the other, a distance h, is $$t = h/V_{drift}. \quad (14)$$

By substituting equations 11, 12 and 13 into equation 14, the following relation is obtained:

$$\frac{\bar{z}}{h} = \sqrt{\frac{4kT}{\pi eV}}, \quad (15)$$

where V=Eh is the potential drop across the gap h. Hence, the rms diffusion displacement expressed as a fraction of the drift path h is inversely related to the square root of the potential drop across the gap.

At room temperature (298° K), the factor which multiplies $V^{-\frac{1}{2}}$ has the value 0.181. Therefore, for room temperature, equation 15 may be rewritten as $$\bar{z} = 0.181 \, (\mu h/V_{drift})^{\frac{1}{2}}. \quad (16)$$

For a given drift velocity and drift length, it is desirable to obtain the smallest mobility of charge carriers in the medium consistent with the other requirements of detector 100.

Some typical mobilities for different materials in gaseous, liquid and solid states are listed in Table I below. The values listed in Table I were obtained from the following sources: Drost et al, "A Xenon Ionization Detector For Digital Radiography", 9 *Med. Phys.* 224-30 (1982); Varney, "Drift velocities of Ions in Krypton and Xenon", 88 *Phys. Rev.*, 362-64 (1952); Hummel et al, 44 *J. Chem. Phys.* 3431 (1966); Davis et al, 39 J. Chem. Phys. 947 (1962); Doe et al, "The Liquid Argon Time Projection Chamber" in *The Time Projection Chamber* (No. 108 AIP Conference Proceedings 1984); and *Handbook of Chemistry and Physics* E-92 (64th Ed. CRC Press 1983). To bring these values into perspective, the expected rms diffusion length $\bar{z}$ of charge carriers from the center of mass of the charge cloud across the drift length was calculated for a 100 cm/s drift velocity and 1 cm high detector 100. These calculated values are also listed in Table I for each material together with the field strength E required to obtain a 100 cm/s drift velocity.

TABLE I

| State | Material | Charge Carrier | Mobility $(cm^2/V\text{-}s)^{\bar{z}}$ | ($\mu$m) | (V/cm) |
|---|---|---|---|---|---|
| Gas | Xe (16 atm) | Xe+ | 0.028 | 30.0 | 3,600.0 |
| Gas | Kr (25 atm) | Kr+ | 0.031 | 32.0 | 3,200.0 |
| Liquid | CCl$_4$ | pos. ions | 0.0004 | 3.6 | 250,000.0 |
|  |  | neg. ions | 0.0003 | 3.1 | 330,000.0 |
| Liquid | Xe (P = 27.9 atm T = 192.1° K.) | Xe+ e$^-$ | 0.0003 190.0 | 3.1 2500.0 | 330,000.0 0.5 |
| Liquid | Ar (P = 44.9 atm T = 145.0° K.) | Ar+ e$^-$ | 0.0026 200.0 | 9.2 2600.0 | 38,000.0 0.5 |
| Liquid | Kr (P = 34.3 atm T = 168.5° K.) | Kr+ | 0.0012 | 6.3 | 83,000.0 |
| Liquid | CH$_4$ | e$^-$ | 500.0 | 4000.0 | 0.2 |
| Solid | ZnS (400° C.) | holes | 5.0 | 400.0 | 20.0 |
| Solid | Ge | holes | 1820.0 | 7700.0 | 0.05 |

It is perhaps worth noting that most research in semiconductors has been directed at speeding up the signal propagation rather than slowing it down. A doping agent introduced into a semiconductive medium would reduce the mobilities of the electrons and the holes. For some applications, however, one might require a very fast scan speed (i.e. rapid movement of detector 100 in the z direction), in which case higher mobilities provided by presently available semiconductor materials would be necessary if operation in the small field region was to be maintained.

If a gaseous medium is used, other gases may be added to the principal species to modify mobility or for other reasons. The medium in detection volume 102 can comprise virtually any material which has a suitable charge mobility for the particular application in which system 200 is to be used. Thus, gaseous and liquid (fluid) ionization chambers or solid state detectors (such as those using silicon, germanium, cadmium telluride or other materials) might all be used in the present invention, depending upon the particular application.

To achieve relatively high detective quantum efficiency, it is desirable that the detection medium have a relatively high x-ray absorption factor. Material with relatively high atomic number and relatively high density would probably be more suitable for use as a detection medium in applications such as digital radiography than materials which have both relatively low atomic number and relatively low density. However, any material in which charge carriers can be produced and made to drift at substantially constant velocities could be used as a detection medium in the preferred embodiment.

Figure 13:
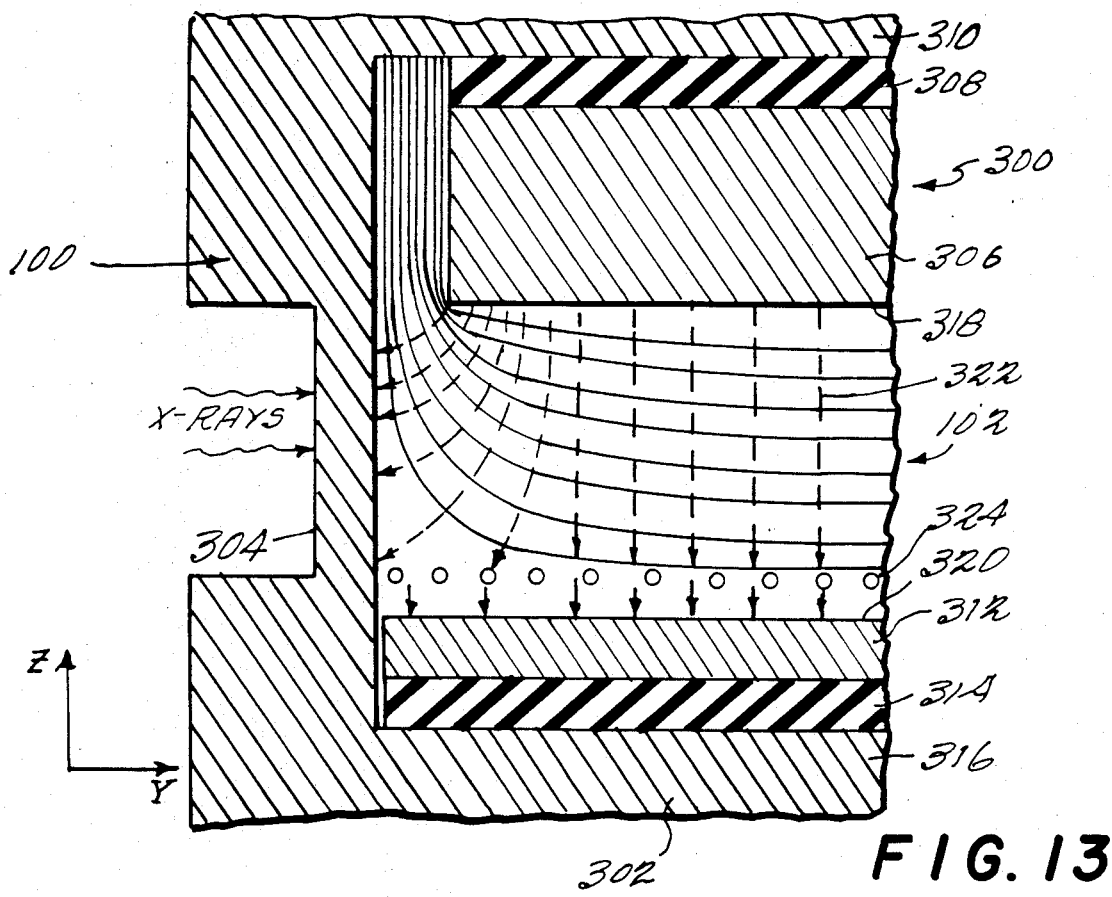
FIG. 13 is a cross-sectional side view of a gas ionization chamber detector in accordance with the present invention.

In the presently preferred exemplary embodiment, the detection material used is xenon gas and detector 100 takes the form of a gas ionization chamber 300. FIG. 13 is a cross-sectional side view of chamber 300. Chamber 300 includes a pressure-tight aluminum pressure vessel 302 having defined therein a relatively thin window 304. X-radiation incident on window 304 penetrates the window and enters chamber 300. The walls of vessel 302 other than window 304 are relatively dense and x-radiation cannot penetrate them. Therefore, only x-radiation directed at window 304 enters chamber 300.

The thickness of the x-radiation beam which enters the detector may be varied by varying the separation distance between the opposing sides of the pre-patient collimator (see slot 32 defined in collimator 14 shown in FIG. 2). This can be very important, for example, in reducing the resolution degradation of space charge effects by reducing x-ray beam thickness. Beam thickness can also be varied to obtain desired spatial resolution or to increase integration time (and thus reduce quantum noise effects) for dense objects.

A high-voltage plate (electrode) 306 is mounted on an insulator 308. Insulator 308 is, in turn, mounted on a wall 310 of vessel 302 within chamber 300. In a similar fashion, at least one collection electrode 312 is mounted on an insulator 314, the insulator being mounted on a wall 316 of vessel 302 within chamber 300. High-voltage plate 306 and collection electrode 312 each comprise electrically-conductive plates electrically accessible from outside vessel 302 via conventional feed-through insulators or the like (not shown).

High-voltage plate 306 defines a substantially flat (planar) surface 318 facing into chamber 300 toward collection electrode 312. Likewise, collection electrode 312 defines a substantially flat (planar) surface 320 facing into chamber 300 and opposing surface 318 of high-voltage plate 306. The space between surfaces 318 and 320 comprises detection volume 102, and is filled with a detection medium (xenon gas at a predetermined temperature and pressure in the preferred embodiment). The distance between surfaces 318 and 320 may be selected to be any convenient value (since resolution in the sampling direction depends not on this distance but upon output signal sampling rate), although the distance should not be so large that volume recombination of the drifting charge carriers becomes excessive. The distance should be selected in accordance with the scanning velocity $v_{scan}$ to provide a desired charge integration period in order to reduce the effects of photon noise and to provide desired detective quantum efficiency. In the preferred embodiment, the distance between surfaces 318 and 210 is within the range of approximately 2 mm-20 mm.

Collection electrode 312 is externally connected to electrical virtual ground potential, while high-voltage plate 306 is electrically connected to a relatively high, constant voltage potential (approximately 5 kilovolts in the preferred embodiment). Due to the drop of electrical potential between surface 318 and surface 320, electrical field lines 322 are produced between the two surfaces. The electrical field existing between surfaces 318 and 320 is substantially uniform and constant (except near the front portion of the chamber 300, see FIG. 13, and near the back portion of the chamber).

In the preferred embodiment, there is not one but a plurality of respective collection electrodes 312 arranged in a linear array on insulator 314. Each of the collection electrodes defines a surface 320 which is planar and opposes surface 318 of high-voltage plate 306. All of the planar surfaces of the plural collection electrodes are coplanar (and thus, these surfaces together define a plane). Each of collection electrodes 312 corresponds to a collection element 106 of FIG. 4A. If desired, elements can be disposed between adjacent ones of plural collection electrodes 312 to reduce cross-talk between collection elements 106 provided detective quantum efficiency is not too seriously degraded and element spacing is not adversely affected by the addition of such separators (and E-field distortions caused by conductive separators or caused by charge build-up in proximity to insulative separators are not too serious).

As mentioned previously, the signal collection region should be shielded from any signal induced by charge carriers drifting in the x-ray detection region. Therefore, in the preferred embodiment, a conventional Frisch grid 324 is positioned between high-voltage plate 306 and collection electrode 312 parallel to and spaced a predetermined distance away from collection electrode 312. Details in respect to the design and construction of Frisch grid 324 may be found, for example, in the following references: Wilkinson, *Ionization Chambers and Counters*, Chapter 4, pages 74-77 (1950); Rossi et al, *Ionization Chambers and Counters*, Chapter 2, pages 37-39 and Chapter 6, Section 6.1 (McGraw-Hill 1949); Buneman et al, "Design of Grid Ionization Chambers", A27 *Can. J. Res.* 191 (1949); O. R. Frisch, Unpublished Report BR-49, British Atomic Energy Project; and U.S. Pat. No. 4,047,040 to Houston (1977).

It is undesirable for x-radiation to be permitted to enter the space between grid 324 and surface 320, since the grid does not provide shielding for charge carriers in this space and the charges will therefore continuously induce charge on collection electrode 312. Therefore, in the preferred embodiment, the pre-patient collimator is designed to produce an x-ray beam no wider than the distance between surface 318 and grid 324 (the space between these two thus comprising detection volume 102). Even so, the charges produced in detection volume 102 which have passed through grid 324 on their way to surface 320 continuously induce charges on collection electrode 312 from the time they pass through the grid 324. It is therefore desirable to increase the electric field intensity (and thus the velocity $v_{drift}$ of the charge carriers) between grid 324 and surface 320 by appropriately selecting the distance between grid 324 and surface 320 relative to the distance between the grid and surface 318, and by selecting the grid potential with respect to the potential of collection electrode 312 and high-voltage plate 306. In this way, the time charge carriers exist in the space between grid 324 and electrode 312 can be made very short to reduce loss of resolution and resulting image blurring.

When x-radiation enters chamber 300 through window 304, it ionizes the xenon gas in detection volume 102 to form clouds 110 of charge carriers as previously described. The electrons of the charge pairs begin to drift toward high-voltage plate 306 under the force of the electric field, while the positive ions drift toward collection electrode 312. When the positive ions pass through grid 324, they begin to induce a charge on collection electrode 312 which increases until the time they strike the electrode. The current flowing in collection electrode 312 (measured by conventional means) is proportional to the number of charge carriers striking the collection electrode and thus, is proportional to the intensity of the x-radiation entering the chamber 300.

Chamber 300 in the preferred embodiment is translated (and/or rotated) in the z direction as previously described at a velocity substantially equal to the velocity at which the positive ions drift toward collection electrode 312 (or if negative ions are being collected, at the velocity of the negative ions). Therefore, the clouds 114 of positive ions are fixed with respect to the x-radiation source (not shown), and strike collection electrode 312 at the instant the position of the collection electrode in the z direction corresponds to the position of the charge clouds in the z direction. In this way, gas ionization chamber 300 is operated in the "kinestatic" mode in accordance with the present invention, and obtains all of the advantages previously described. As mentioned, spatial resolution of detector 100 in the scanning direction is dependent on the product of the output sampling time $\tau$ and scanning velocity $V_{scan}$, but not on the size of the gap between surfaces 318 and 320.

It is important to the operation of the present invention that the drift velocity of the charge clouds be known so that the detector 100 can be moved at a velocity equal in magnitude to $v_{drift}$. The drift velocity is constant only to the extent that the electric field existing between surfaces 318 and 320 is uniform. Therefore, high-voltage electrode 306 and collection electrode 312 must be designed to assure that the field in detection volume 102 is constant, uniform and parallel to the desired direction of drift of the charges. Any distortions in the electric field between surfaces 318 and 320 can cause non-linearity and motion blurring due to variations in the drift velocity and variations in the path length along the electric field lines of force between surfaces 318 and 320.

One region within gas ionization chamber 300 in which the electric field may be distorted is in the space in proximity to front window 304 or the rear wall of the chamber (not shown). FIG. 13 shows calculated equipotential lines in a cross-section orthogonal to the radiation entrance window 304 and electrodes 306 and 312. The field is homogenous, uniform and constant deep in detection volume 102. However, near window 304, the density of field lines is reduced, the electric field has a lower than average value in this area, and bending of the lines of force occurs. Distortion of the electric field in the area of window 304 reduces the detective quantum efficiency of detector 100 by creating a "dead space" near the window. Because the field lines of force end on vessel 302 rather than collection electrode 312 in this "dead space", charges formed in the "dead space" strike window 304 and do not contribute to the signal output of detector 100. Perhaps more importantly, the lines of force which do point toward collection electrode 312 near the window 304 are curved rather than linear, and cause charge carriers following them to travel over a longer path than they would if the lines of force were linear. Image blurring may result because such charge carriers take a longer time to traverse the detection volume 102 and therefore are not stationary in space as detector 100 is translated in the z direction at constant velocity.

Figure 14:
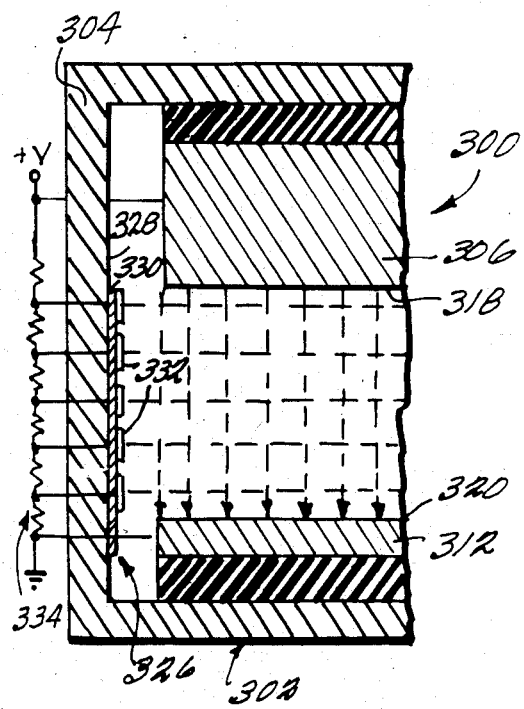
FIG. 14 is a cross-sectional side view of another embodiment of a gas ionization chamber detector in accordance with the present invention.

FIG. 14 is a cross-sectional side view of another embodiment of the gas ionization chamber 300 in accordance with the present invention including a means 326 for causing the electric field to be more uniform in the region in proximity to window 304. To reduce the electric field distortions present in proximity to window 304, means 326 maintains the voltage distribution near the inner surface 328 of the window to be exactly or approximately the same as that existing deeper within chamber 300.

In the embodiment shown in FIG. 14, a layer 330 of insulative or quasi-insulative material is disposed on surface 328 and a plurality of evenly-spaced parallel conductive (e.g. metallic) strips 332 are fixed to the insulative layer. The strips 332 are connected to an external voltage divider 334, the voltage divider being connected between the potential of high-voltage plate 306 and the potential of collection electrode 312. Voltage divider 334 steps down the voltage potential applied to it in discrete steps and applies the stepped-down voltages to strips 332 to cause positions on surface 328 to have an electric field intensity equal to corresponding positions deeper within chamber 300. Strips 332 near plate 306 have a higher voltage applied to them than do strips 332 close to collection electrode 312, and voltage divider 334 is constructed so that the voltages it produces correspond to the physical positions of strips 332.

In this way, the electric field lines of force produced between electrodes 306 and 312 have minimal distortion in proximity to window 304. If desired, strips 332 and voltage divider 334 could be replaced by a continuous sheet of high resistance material functioning as a continuous internal voltage divider to continuously match the potential distribution within chamber 300. The advantages of the embodiment shown in FIG. 14 include higher quantum detection efficiency (because of the reduced "dead space") and higher spatial resolution (due to reduced electric field distortion). Such electrodes or resistive strips can also be disposed on the back wall (not shown) of chamber 300 to correct distortions in the electric field occurring there. In this way, the potentials across the front and back windows of the chamber can be forced to change linearly with distance in the z-direction to allow a thin plane of charge to remain a plane while drifting through the chamber and thereby improve spatial resolution.

Another effect which can distort the electric field is the space charge of the charges produced in the detection volume 102 of detector 100. In the embodiment shown in FIG. 13, the positive charge carrier density varies linearly from zero at a position very close to surface 318 to a constant value $n_0^+$ in the area immediately adjacent to surface 320. Similarly, the negative charge carrier density varies linearly from $n_0^-$ proximity to surface 318 to zero in proximity to surface 320. The values of these constants, $n_0^+$ and $n_0^-$, depend on the ionization rate of the material in the detection volume 102, the length of the path along which the ions drift, the strength of the electric field, and the mobility of the ions in the material. If Poisson's equation (mks units)

$$\nabla^2 U(z) = -\rho/\epsilon \tag{17}$$

with $$\rho = \frac{e}{h}(n_0^+ z - n_0^-(h - z)) \tag{18}$$

is solved for $$0 < z < h \tag{19}$$

under the boundary conditions $U(0)=V_0$, $U(h)=0$ and $E_0=V_0/h$, the following relation is obtained:

$$E(z) = \tag{20}$$
$$E_0 + \frac{e}{\epsilon h}\left[n_0^+\left(\frac{z^2}{2} - \frac{h^2}{6}\right) + n_0^-\left(\frac{z^2}{2} - hz + \frac{h^2}{3}\right)\right].$$

The second term in equation 20 is the space charge component of the field strength. To maintain a constant field, this space charge component should be small compared with the external field, $E_0$.

When the positive and negative charge carriers have the same mobility, then $n_0^+ = n_0^- = n_0$ and equation 20 reduces to $$E(z) = E_0 + \frac{en_0}{\epsilon h}\left[z^2 - hz + \frac{h^2}{6}\right]. \tag{21}$$

The intuitive interpretation of equation 21 is that the space charge decreases the electric field strength in the center of the drift region and increases it near the ends.

When the negative charge carriers drift at a velocity which is much greater than the velocity at which the positive charge carrier drift, equation 20 reduces to $$E(z) = E_0 + \frac{en_0^+}{\epsilon h}\left[\frac{z^2}{2} - \frac{h^2}{6}\right]. \tag{22}$$

In this case, the space charge decreases the electric field intensity near surface 318 of high-voltage electrode 306 and increases the field intensity near surface 320 of collection electrode 312.

The largest alteration of the field strength occurs for the case described by equation 22 where $z = h$:

$$E(h) - E_0 = \frac{en_0 h}{3\epsilon}. \quad (23)$$

For a charge carrier concentration, $n_0$, of $10^8$ cm$^{-3}$ in a 1 cm drift length, the maximum field arising from the charges is approximately 60 V/cm.

To maintain constant charge carrier drift velocity, the x-radiation flux must be kept low enough to prevent significant modification of the field within detection volume 102 by the effects of space charge. There is a trade-off between x-ray photon statistics and the spatial blurring due to field non-uniformities at a high x-ray flux. It can be shown that for a fixed drift or scan velocity and total dose, the fractional change in the electric field arising from the charge distribution increases linearly with the drift distance and the mobility. However, in other applications where higher incident x-ray intensities are permitted and desired, care must be taken to prevent excessive space charge from adversely affecting the uniformity of the charge carrier drift velocity. This can be done by reducing the x-ray beam thickness, or by using a detecting medium with lower mobility charges or one that produces fewer charge carriers per interacting beam photon.

Figure 15:
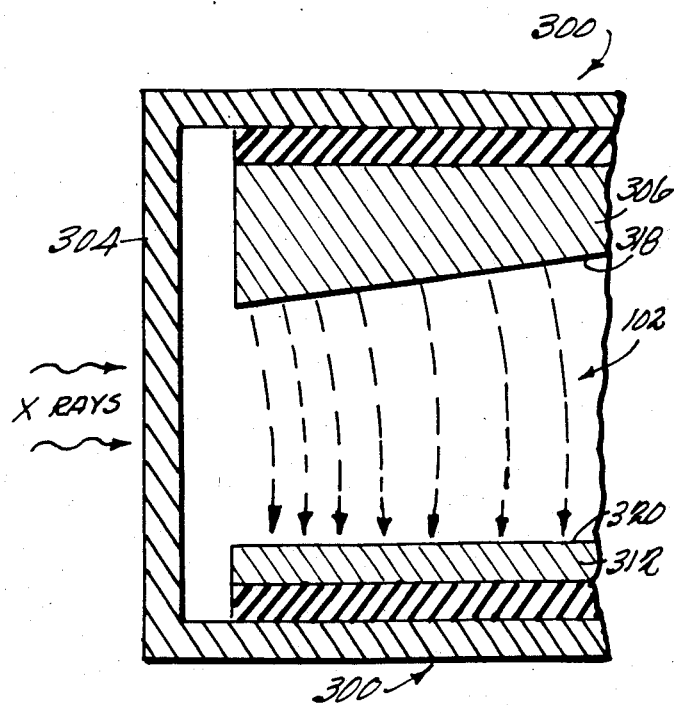
FIG. 15 is a cross-sectional side view of a third embodiment of a gas ionization chamber detector in accordance with the present invention.

FIG. 15 is a cross-sectional side view of another embodiment of a gas ionization chamber detector 300 in accordance with the present invention wherein surface 318 of electrode 306 is tilted or curved rather than being planar and parallel to surface 320. In the embodiment shown in FIG. 15, the electric field intensity varies with the depth (y coordinate) of detection volume 102. Charge carriers produced near window 304 are subjected to a different intensity electric field than that applied to charge carriers produced deeper in the chamber 300. The capability to tilt the high-voltage plate partially compensates for the higher space charge present in the front of detector 100, and has other advantages as well.

For example, referring to FIGS. 6A and 6B, charge clouds produced on line 214 near the back of detector 100 (i.e., farther away from source 202) have to travel at a velocity slightly greater than the velocity of the charge clouds produced on line 214 near the front of the detection (i.e. closer to the source) if all of the charge clouds on line 214 are to enter collection volume 104 simultaneously. This is because the detection medium at the back of the detector moves slightly faster than the detection medium at the front of the detector due to rotation of the detector. Thus, for a system which rotates as well as translates, the electric field intensity at the back of the detector should be slightly higher than the electric field intensity at the front of the detector to ensure the velocities of the charge clouds throughout the detector are exactly equal and opposite to the velocity of the portion of the detection medium through which the charge clouds are travelling.

This result may most easily be obtained by tilting the high-voltage plate (i.e., surface 316 of electrode 306) slightly in a direction opposite to that shown in FIG. 15, so that the width of the gap between surfaces 316 and 320 is slightly larger at the front of the detector (i.e. near window 304) than at the rear of the detector (i.e. away from the window 304). Other means to make the electric field intensity at the rear of the chamber 300 greater than the electric field intensity at the front of the detector (e.g. by disposing separated strips of conductive material extending in the x-direction on the high-voltage plate to create a slightly increasing voltage gradient from the front to the rear of the chamber, using a continuous resistive strip in the same manner, etc.) may be used instead.

Figure 16:
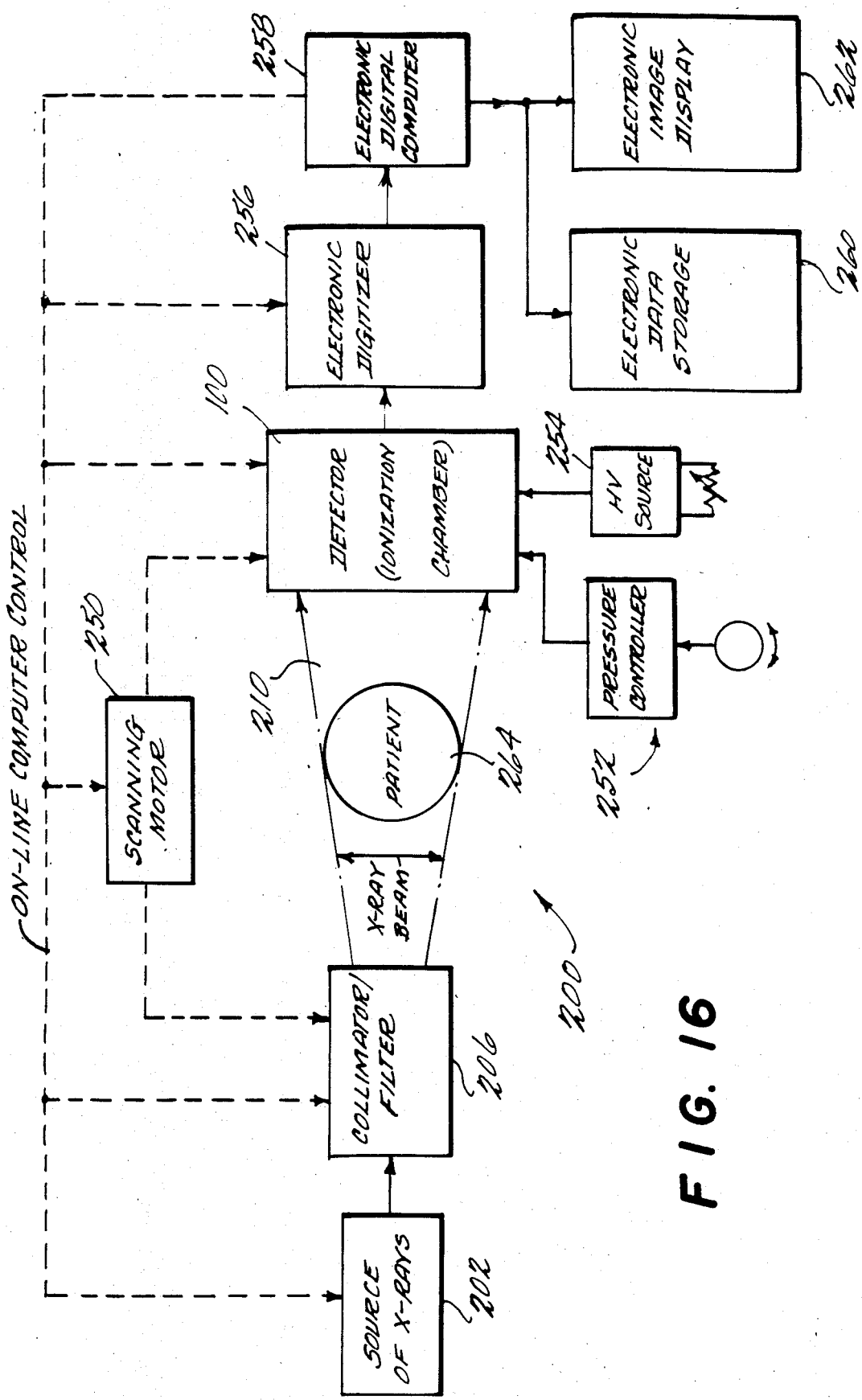
FIG. 16 is a schematic block diagram of an exemplary scanning digital radiography system in accordance with the present invention.

FIG. 16 is a block diagram of the presently preferred exemplary embodiment of the scanning fan beam radiography system 200 shown in FIGS. 6A and 6B. System 200 includes, in addition to source 202, collimator 206 and detector 100 the following components: a scanning motor 250, a pressure controller 252, a high-voltage source 254, an electronic digitizer 256, an electronic digital computer 258, an electronic data storage 260 and an electronic image display 262. As previously described, source 202 directs x-radiation toward collimator 206. Collimator 206 collimates the x-radiation into a fan beam 210, and directs the fan beam toward a patient 264 (or other object of interest). Patient 264 may be resting on a platform the position of which is automatically adjustable by computer 258 if desired. The radiation passing through patient 264 is detected by detector 100. If detector 100 takes the form of the embodiment shown in FIG. 13, it is connected to a pressure controller 252 (which provides xenon gas under pressure to the detector) and to a high-voltage source 254 (which provides the potential necessary to generate the electric field within the detector). Pressure controller 252 varies the pressure of the xenon gas within the detector 100 automatically and/or manually to permit a desired predetermined gas pressure to be maintained within the chamber 300. High-voltage source 254 automatically and/or manually selects the potential between electrodes 306 and 312 (and also the potential of Frisch grid 324) to permit the intensity of the electric field to be varied. As mentioned previously, by varying the density of the gas within detector 100 and/or the intensity of the electric field within the detector, the charge carrier drift velocity $v_{drift}$ (as well as other parameters of the detector) can be selected.

Scanning motor 250 is mechanically connected to both collimator 206 and detector 100 as previously described in connection with FIGS. 6A and 6B. Scanning motor 250 in the preferred embodiment is operated under the control of electronic digital computer 258, and has a velocity which can be selected for different scan rates. Due to the precise relationship necessary between the drift velocity $v_{drift}$ of the drifting charge carriers and the velocity of scanning motor 250, system 200 is calibrated by selecting a desired velocity of scanning motor 250 and then fine-tuning the ionization drift velocity (e.g. for minimum image blurring) by adjusting pressure controller 252 and high-voltage source 254. The velocity at which detector 100 is scanned is selected consistent with elimination of motion artifacts and maximum source 202 duty time.

The electrical output of detector 100 is applied to the input of a conventional electronic digitizer 256 having a sampling rate which is selected under control of computer 258. Electronic digitizer 256 samples the electrical output of detector 100 at predetermined periodic intervals, and converts the resulting amplitude measurements to digital values. Computer 258 analyzes the digital values produced by digitizer 256 using known techniques and generates an image of the spatial distribution of the intensity of x-radiation passing through patient 264. Electronic image display 260 displays the generated image, while electronic data storage 260 stores the image in digital form for later retrieval and analysis.

Although exemplary embodiments have been described in detail above, those skilled in the art will appreciate that many variations and modifications may be made without departing from the novel and advantageous features of the invention. Moreover, the present invention is by no means limited to the particular components described above, but rather, could be implemented in a variety of other ways.

For instance, although the preferred embodiment uses a Frisch grid to desensitize the collection electrode to continuous charge induction by charge carriers in the detection volume, the signal collection elements or the data acquisition system connected to the detector could be made to detect only quantum increases in current flowing in the collection electrode and not continuous current increases, and the Frisch grid could be eliminated. The shielding provided by the Frisch grid would also be unnecessary if the detector was operated with a sufficiently high electric field intensity to induce charge multiplication ("avalanching") in proximity to the collection electrode and desensitizing the electronic circuitry connected to the collection electrode to make it sensitive only to the large-amplitude charges caused by the onset of charge multiplication. Alternatively, the Frisch grid might be replaced with any third electrode disposed to receive most of the lines of force from charge carriers of the opposite polarity.

Although the preferred embodiment has been described as using a single Frisch grid, two or more respective Frisch grids could be placed at different z-locations in the ionization chamber to divide the chamber into three (or more) volumes. The position of a first Frisch grid could be shifted (in the x and/or y directions) with respect to the position of a second Frisch grid so that the wires of the first Frisch grid lie intermediate (in the x and/or y directions) between the wires of the second Frisch grid. Because the spatial resolution of the detector is related to the ratio of the last electric field to the first electric field, a single Frisch grid detector with, for example, a 9:1 field ratio has the same resolution to first order as a dual-grid chamber with two 3:1 field boosts. However, the actual resolution of the two-grid chamber is better than that of the chamber with only one grid because the second grid can be made to compensate for field distortions produced by the first grid.

The collecting elements in the preferred embodiment are continuous in the y-direction. However, the signal collectors could be divided into plural segments in the y-direction so that front collector segments receive predominantly low energy X-rays while back collector segments receive predominantly high energy X-rays. Likewise, two parallel detectors placed at different z-positions could be used, and the X-ray beam could repeatedly be switched so that high and low energy X-rays are alternately produced. If a ratio between the switching repetition rate and the distance between the detectors is chosen such that the low energy pulses of one detector are interleaved with the low energy pulses of the other detector, the total space is completely covered by both low and high energy beams. Such dual energy imaging allows the removal of one background component (e.g., bone) from an image. Dividing the collection volume into plural segments in the y-direction has the advantages of not requiring the X-ray beam to be switched and permitting the use of only one detector. Providing parallel detectors placed at different z-positions yields better energy separation and therefore better component subtraction.

Although the electric field induced across the detection medium should generally be uniform and constant, it may sometimes be desirable to vary the electric field intensity in time and/or dependent upon position within the detector. For instance, where the detector is pivoted about the focal point of the radiation source, it might be desirable to vary the electric field intensity so that $$E_z(y) = E_z(y_0) \cdot \frac{y}{y_0}, \tag{24}$$

here, e.g., $y_0$ is the distance from the pivot point to the front window of the detector. In this way, the drift velocities of the charge carriers throughout the detector are forced to vary directly with the radial distance of the charge carriers from the pivot point. Since the detection medium is also moving with a velocity which varies directly with radial distance, "kinestasis" is achieved at all y-values in the medium, thereby preventing losses in spatial resolution. The electric field intensity may be varied in this manner by tilting the high voltage plate so that the gap between the two electrodes, $\Delta Z(y)$ is approximately equal to $\Delta Z(y_0) \cdot y_0/y$, or with curved plates, resistive strips or separate conducting fingers, as described previously.

As described in connection with FIG. 15, it may be desirable (e.g., for reducing the effects of space charge) to make the electric field intensity greater near the front of the detector than near the back of the detector. Since this requires a correction to the electric field intensity opposite the correction required to account for pivoting of the detector, compromises and trade-offs may have to be made to correct for the worst of these two problems.

Although positive ions are detected in the preferred embodiment, negative ions or both types of ions could be detected, for example, by reversing the polarity of the high voltage. Likewise, either the positively-charged or the negatively-charged electrode could be used as the collection electrode.

While the the preferred embodiment has been described as operating in a charge integrating mode, the present invention might possibly find applicability in other modes of operation, such as in the charge counting (proportional counter) mode.

Although the preferred embodiment uses xenon gas as an ionizing medium, virtually any material (solid, liquid, or gas; insulating semiconducting or conducting) could be used instead. To reduce the velocities of the negative charge carriers, an "electron-scavenging" (i.e., electron-attaching) impurity gas (e.g. $O_2$, $SF_6$, $WF_6$, etc.) might be added to make the mobility of the negative charge carriers approximately equal to that of the positive charge carriers (by causing electrons to quickly attach to produce negative ions) in order to reduce space charge effects occurring at high x-radiation fluxes (thereby reducing space charge degradation of E-field uniformity).

Moreover, if an appropriate impurity gas were added to cause the negative charge carriers to have lower mobilities than the positive charge carriers, collection of the negative carriers rather than the positive carriers could permit reduced scanning velocity under the same E-field and pressure conditions, or the same scanning velocity at a higher E-field/pressure ratio. The former condition would allow a slower scan speed and increased radiation detection (higher S/N) while the latter condition might be useful to reduce space charge effects. Other additive gases or even totally new gases might be added to the principal species for other reasons, such as to form molecular ions composed of the principal gas and added species to modify mobility. Another possible use of adding a second gas would be to enhance the x-ray absorption of the medium or to effect the release and re-absorption of secondary x-rays or electrons (to improve resolution or reduce noise). An interesting candidate for the added gas is the very heavy gas $WF_6$.

Although the preferred embodiment uses a scanning fan beam of x-radiation, the principal reason for the use of such a beam is to reduce patient dosage in radiography of human subjects and to reduce x-ray scattering. Such considerations may not be present in other applications, such as industrial radiography, and a wide-area or pencil beam of x-radiation could be substituted for the fan beam. Moreover, the present invention is by no means limited to radiography applications, but would find applicability in any application where detection of charges associated with ionization events resulting from virtually any process is desirable. Moreover, ionization need not occur within the medium, but instead, ions might be injected into the medium.

Detection of charge carriers is accomplished in the preferred embodiment by sensing the current flowing in detecting electrodes. However, others ways to detect charge carriers (such as scintillation detection techniques, continuous scanning by a scanning electron or laser beam, or any other spatially-discriminating signal detection or recording technique) are all possible, and the present invention should not be considered as limited to any particular method of detecting charge carriers. Moreover, the output of the signal detection device may be of any form, such as electrical signals, electromagnetic energy, acoustic energy, photographically or otherwise recorded images, etc. The collection electrodes could be arranged in any desired manner, such as in an arc or in special patterns determined by a particular application. Moreover, the present invention is by no means limited to two-dimensional detection of charge carrier spatial distribution, but might also be used for distribution detection in one or three dimensions.

Although translation of the detector at constant velocity is used in the preferred embodiment, non-linear, non-random translation of the detector at varying velocities dependent upon, for example, varying medium mobility and/or electric field intensity, could be useful in other applications. Likewise, although the x-radiation in the preferred embodiment is continuously directed toward the detector, a pulse mode of operation might be desirable depending upon the application (e.g. to allow time for electronic integration or autozeroing) and/or the properties of the radiation source. Accordingly, all such variations and modifications are intended to be included within the scope of the claims.

What is claimed is:

1. An apparatus for detecting propagating energy comprising:
    means for defining a space upon which propagating energy is incident;
    medium means, disposed within said space, for interacting with said incident energy to produce secondary energy;
    first position-changing means for non-randomly changing the position of the secondary energy within said space relative to said medium means;
    second position-changing means for changing the position of said space synchronously with the change of position of said secondary energy; and
    detecting means for detecting the secondary energy in said space.

2. An apparatus as in claim 1 wherein said second position-changing means comprises means for moving said space in a direction opposite to the direction of motion of said secondary energy with respect to said medium means at a velocity equal in magnitude to the velocity of said secondary energy with respect to said medium means.

3. An apparatus as in claim 1 wherein:
    said secondary energy includes charge carriers; and
    said first position-changing means comprises means for producing a uniform electric field within said space.

4. An apparatus as in claim 3 wherein:
    said electric field induces said charge carriers to drift through said space at a first substantially constant velocity in a first substantially constant direction; and
    said second position-changing means comprises means for displacing said space-defining means at said first velocity in a second direction opposite to said first direction.

5. An apparatus as in claim 4 further comprising means for directing said incident energy perpendicularly to said first and second directions into said medium means to produce charge carriers in said medium means.

6. An apparatus as in claim 4 wherein said electric-field-producing means produces an electric field having a direction parallel to said first and second directions.

7. An apparatus as in claim 1 wherein said first position-changing means comprises means for inducing the secondary energy to drift through said space at a constant drift velocity in a predetermined direction.

8. An apparatus as in claim 1 wherein:
    said apparatus further includes means for defining a collection volume within said space; and
    said detecting means detects secondary energy within said collection volume.

9. An apparatus as in claim 8 wherein said detecting means comprises:
    means for detecting the position of secondary energy within said collection volume; and
    means for detecting the time said secondary energy enters said collection volume.

10. An apparatus as in claim 9 wherein:
    said energy-position-detecting means comprises means for sensing the position of secondary energy within said collection volume along a first coordinate axis; and
    said apparatus further includes:
        means for creating secondary energy in said space, and
        means for determining a position of creation of secondary energy in said space along a second coordinate axis perpendicular to said first coordinate axis in response to the detected time said secondary energy enters said collection volume.

11. An apparatus for detecting radiation comprising
medium means for producing at least one charge carrier in response to radiation incident thereto;
charge carrier displacing means for non-randomly changing non-randomly changing the position of said charge carrier relative to said medium means in a first direction;
medium displacing means for changing the position of said medium means synchronously with the change in position of said charge carrier in a second direction opposite to the first direction; and
detecting means for detecting charge carriers in said medium.

12. An apparatus as in claim 11 wherein said medium displacing means comprises means for moving said medium means in a direction opposite to the direction of motion of said charge carrier at a velocity equal in magnitude to the velocity of said charge carrier.

13. An apparatus as in claim 11 wherein said charge-carrier-displacing means comprises means for producing a uniform electric field within said medium means.

14. An apparatus as in claim 13 wherein:
said electric field induces said charge carrier to drift through said medium means at a first substantially constant velocity in the first direction; and
said medium-displacing means comprises means for displacing said medium means at said first velocity in the second direction opposite to said first direction.

15. An apparatus as in claim 14 further comprising means for directing said incident radiation into said medium means perpendicularly to said first and second directions.

16. An apparatus as in claim 14 wherein said electric field produced by said electric field producing means is in a direction parallel to said first and second directions.

17. An apparatus as in claim 11 wherein said charge-carrier-displacing means comprises means for inducing said charge carrier to drift through said medium means at a constant drift velocity in a predetermined direction.

18. An apparatus as in claim 11 wherein:
said apparatus further includes means for defining a collection volume adjacent to said medium; and
said detecting means detects charge carriers within said collection volume.

19. An apparatus as in claim 18 wherein said detecting means comprises:
means for detecting the position of charge carriers within said collection volume; and
means for detecting the time said charge carriers enter said collection volume.

20. An apparatus as in claim 19 wherein:
said charge-carrier position-detecting means comprises means for sensing the position of said charge carrier within said collection volume along a first coordinate axis; and
said apparatus further includes means for determining the position at which said charge carrier was produced in said medium means along a second coordinate axis perpendicular to said first coordinate axis in response to the time detected by said time detecting means.

21. An apparatus for storing information comprising:
a medium;
means for selectively producing charge carriers in said medium;
means for preventing said charge carriers from recombining by biasing said charge carriers to move in a first direction;
means for displacing said medium relative to said charge-carriers-producing means in a second direction opposite to the first direction; and
detecting means for detecting charge carriers within a predetermined portion of said medium.

22. An apparatus as in claim 21 wherein said recombining preventing means comprises means for non-randomly changing the position of said charge carriers relative to said medium.

23. An apparatus as in claim 21 wherein said charge carrier producing means comprises means for selectively directing ionizing radiation into said medium.

24. An apparatus for integrating charge comprising;
a medium;
means for continuously directing radiation along a path passing through said medium, said medium producing secondary energy in proximity to said path in response to said radiation;
means for maintaining said secondary energy in proximity to said path and for preventing said secondary energy from recombining with said medium; and
means for measuring the amount of secondary energy in proximity to said path.

25. An apparatus as in claim 24 wherein said maintaining means comprises:
means for displacing said secondary energy relative to said medium; and
means for displacing said medium relative to said path synchronously with the displacement of said secondary energy.

26. An apparatus as in claim 25 wherein said energy-displacing means comprises means for inducing said secondary energy to drift through said medium at a constant drift velocity in a predetermined direction.

27. An apparatus as in claim 25 wherein:
said secondary energy includes ions; and
said energy-displacing means comprises means for producing a uniform electric field through said medium.

28. An apparatus as in claim 27 wherein:
said electric field produced by said electric-field-producing means induces said ions to drift through said medium at a first substantially constant velocity in a first substantially constant direction; and
said medium-displacing means comprises means for displacing said medium at said first velocity in a second direction opposite to said first direction.

29. An apparatus as in claim 28 wherein said electric-field-producing means produces an electric field having a direction parallel to said first and second directions.

30. An apparatus as in claim 28 wherein said path is perpendicular to said first and second directions.

31. An apparatus as in claim 28 wherein said radiation-directing means includes:
means for producing x-rays; and
collimating means for focusing said x-rays into a beam perpendicular to said first and second directions.

32. An apparatus as in claim 24 wherein:
said radiation directing means selectively directs radiation along a plurality of parallel paths passing through said medium to produce secondary energy in proximity to each of said paths; and said maintaining means also maintains secondary energy produced in proximity to each of said plurality of paths in proximity to each said paths.

33. An apparatus as in claim 24 wherein:
said apparatus further includes means for defining a collection volume adjacent to said medium; and
said measuring means measures the secondary energy within said collection volume.

34. An apparatus as in claim 33 wherein said measuring means comprises:
means for detecting the position of secondary energy within said collection volume; and
means for detecting the time said secondary energy enters said collection volume.

35. An apparatus as in claim 34 wherein:
said energy-position detecting means comprises means for sensing the position of said secondary energy within said collection volume along a first coordinate axis; and
said apparatus further includes means for determining the position in said medium along a second coordinate axis perpendicular to said first coordinate axis at which said secondary energy is produced in response to the time detected by said time detecting means.

36. An apparatus for detecting the spatial distribution and intensity of radiation, comprising:
a first means for conducting electrical current;
a second means for conducting electrical current;
means for fixing the position of said second conducting means with respect to said first conducting means to define a gap therebetween;
radiation source means for directing ionizing radiation into said gap;
medium means, disposed within said gap, for ionizing in response to said radiation to produce charge carriers;
charge carrier displacing means, electrically connected to said first and second conducting means, for inducing the charge carriers within said gap to drift at a velocity $v_{drift}$ in a first direction;
moving means, coupled to at least one of said source means and said medium means, for moving said medium means relative to said source means in a second direction opposite to said first direction at a velocity $v_{scan}$ having a magnitude substantially equal to the magnitude of the velocity $v_{drift}$ of said drifting charge carriers; and
detecting means for detecting charge carriers in said gap.

37. An apparatus as in claim 36 wherein said radiation source means comprises:
means for producing x-radiation; and
means for focusing said x-radiation into a beam directed toward on said gap in a direction perpendicular to the first and second directions.

38. An apparatus as in claim 37 wherein said moving means is also coupled to said focusing means and maintains said focusing means in a predetermined orientation with respect to said gap.

39. An apparatus as in claim 36 wherein:
said fixing means comprises means for defining a chamber;
said medium means comprises a pressurized fluid; and
said apparatus further includes means for selecting the drift velocity $v_{drift}$ of said carriers, said drift velocity selecting means including means for adjusting the pressure of said fluid.

40. An apparatus as in claim 39 wherein:
said charge-carrier-displacing means comprises means for producing an electric field between said first and second conducting means; and
said drift-velocity-selecting means further includes means, operatively connected to said electric-field-producing means, for adjusting the intensity of said electric field.

41. An apparatus as in claim 36 wherein:
said charge-carrier-displacing means comprises means for producing an electric field between said first and second conducting means; and
said apparatus further includes means, operatively connected to said electric-field-producing means, for selecting the drift velocity $v_{drift}$ of said carriers.

42. An apparatus as in claim 36 wherein:
said second conducting means comprises plural respective electrodes each disposed a predetermined distance from said first conducting means; and
said detecting means comprises means for sensing signals induced in said plural electrodes by said charge carriers.

43. An apparatus as in claim 42 wherein said sensing means comprises means for sensing the currents flowing in said plural electrodes with respect to time.

44. An apparatus as in claim 43 wherein:
said plural electrodes are arranged in a linear array along a first coordinate axis; and
said apparatus further includes:
means, operatively connected to said currents sensing means, for determining the spatial distribution of said radiation along said first coordinate axis in response to the relative amplitudes of said sensed currents, and
means, operatively connected to said currents sensing means, for determining the spatial distribution of said radiation along a second coordinate axis perpendicular to said first coordinate axis in response to the amplitudes of said sensed currents with respect to time.

45. An apparatus as in claim 44 wherein said second coordinate axis spatial-distribution-determining means includes means for sampling said sensed currents at a predetermined sampling rate corresponding in duration to the length of a desired resolution element along said second coordinate axis.

46. An apparatus as in claim 36 wherein said moving means comprises means for rotating said fixing means at a constant velocity $v_{scan}$ along a circle having a center at said radiation source means.

47. An apparatus as in claim 36 wherein said charge-carrier-displacing means comprises means for producing a uniform constant electric field between said first and second conducting means.

48. An apparatus as in claim 47 wherein:
said fixing means comprises an enclosure including first and second opposing walls and a third wall attached to said first and second walls, said first conducting means disposed on said first wall, said second conducting means disposed on said second wall; and
said apparatus further comprises means, disposed on a first surface of said third wall within said enclosure, for correcting distortions in said electric field in proximity to said third wall first surface.

49. An apparatus as in claim 48 wherein said correcting means comprises third electrical conducting means, disposed on said third wall first surface and electrically connected between said first and second conducting means, for forcing a constant potential gradient to exist in proximity to said third wall first surface.

50. An apparatus as in claim 49 wherein said third conducting means comprises a sheet of resistive material.

51. An apparatus as in claim 49 wherein said third conducting means comprises:
plural respective electrically conductive strips each disposed on said third wall first surface parallel to at least one of said first and second conducting means;
voltage-dividing means, electrically connected between said first and second conducting means, for producing plural voltage levels; and
means for applying said plural voltage levels to said respective conductive strips.

52. An apparatus as in claim 36 wherein:
said first conducting means comprises a first plate including means for defining a curved surface thereon; and
said second conducting means comprises at least a second plate defining a surface substantially opposing said curved surface.

53. An apparatus as in claim 36 further including means for selectively changing the mobility of only one of the positive charge carriers and the negative charge carriers produced in said medium means.

54. An apparatus for detecting the spatial distribution and intensity of ionizing radiation, comprising:
means for defining a chamber, said chamber-defining means including window means for admitting ionizing radiation into the chamber along at least a first path;
medium means, disposed in said chamber, for ionizing in response to said admitted radiation to produce plural charge carrier pairs, each of said charge carrier pairs comprising a positive charge carrier and a negative charge carrier;
a first electrically-conductive electrode disposed within said chamber, said first electrode including means for defining a first substantially planar surface contacting said medium means;
plural respective electrically-conductive collection electrodes disposed in said chamber, each of said plural collection electrodes including means for defining a substantially planar surface contacting said medium means, said planar surfaces defined by said plural collection electrodes contained in a common plane disposed a fixed distance from said first surface;
means, electrically connected to said first electrode and to each of said plural collection electrodes, for producing a substantially constant, uniform electric field between said first electrode first surface and said plane, the direction of said electric field being substantially perpendicular to the path of said radiation, the electric field causing one of the positive and negative charge carriers of each of said charge carrier pairs to drift in a first direction toward said plane at a substantially constant drift velocity $v_{drift}$;
chamber moving means, mechanically coupled to said chamber, for moving said chamber in a second direction opposite to said first direction at a constant velocity $v_{scan}$ having a magnitude substantially equal to the magnitude of $v_{drift}$;
current sensing means for sensing the current flowing in said plural collection electrodes resulting from charges produced on said collection electrodes by said charge carriers; and
signal processing means, connected to said current sensing means, for determining the spatial resolution in two dimensions of said radiation admitted into said chamber in response to the amplitude with respect to time of current sensed by said current sensing means.

55. An apparatus as in claim 54 further including:
radiation source means for continuously producing ionizing radiation;
collimating means for collimating said radiation into a beam; and
means operatively coupled to said collimating means for directing said beam perpendicular to the direction of said electric field toward said window means.

56. An apparatus as in claim 55 wherein said chamber moving means comprises means for translating said chamber at a constant velocity $v_{scan}$ along a circle having a center at said radiation source means.

57. An apparatus as in claim 54 wherein:
said plural collection electrodes are arranged in a substantially linear array along a first coordinate axis;
said signal processing means includes:
means for determining the spatial distribution of said radiation along said first coordinate axis in response to the relative amplitudes of said sensed currents, and
means for determining the spatial distribution of said radiation along a second coordinate axis perpendicular to said first coordinate axis in response to the amplitudes of said sensed currents with respect to time; and
said current sensing means includes means for sampling said currents at a predetermined sampling rate corresponding in duration to the length along said second coordinate axis of a desired resolution element.

58. An apparatus as in claim 54 further including means, disposed on a first surface of said window means within said chamber, for correcting distortions in said electric field in proximity to said window means.

59. A method of detecting propagating energy comprising the steps of:
(1) defining a space upon which propagating energy is incident;
(2) producing secondary energy in a medium within said space by interacting said medium with propagating energy incident thereon;
(3) non-randomly changing the position of said secondary energy relative to said medium;
(4) changing the position of said space synchronously with the change in position of said secondary energy; and
(5) detecting the secondary energy in said space.

60. A method as in claim 59 wherein said position changing step (3) includes the step of moving said space in a direction opposite to the direction of motion of said secondary energy with respect to said medium at a velocity equal in magnitude to the velocity of said secondary energy with respect to said medium.

61. A method as in claim 59 wherein:
and secondary energy includes charge carriers; and
said position changing step (2) comprises the step of producing a uniform electric field within said space.

62. A method as in claim 61 wherein:
said electric field produced by said electric field producing step induces said charge carriers to drift through said space at a first substantially constant velocity in a first substantially constant direction; and
said position changing step (3) comprises the step of displacing said spacing-defining means at said first velocity in a second direction opposite to said first direction.

63. A method as in claim 62 further comprising the step of directing said incident energy perpendicularly to said first and second directions into said medium to create charge carriers in said medium.

64. A method as in claim 63 wherein said electric field producing step comprises the step of producing an electric field having a direction parallel to said first and second directions.

65. A method as in claim 59 wherein said energy position changing step (2) comprises the step of inducing said secondary energy to drift through said space at a constant drift velocity in a predetermined direction.

66. A method as in claim 59 wherein said detecting step (4) includes the step of detecting secondary energy within a collection volume defined within said space.

67. A method as in claim 59 wherein said detecting step (4) includes the steps of:
detecting the position of secondary energy within a collection volume defined in said space; and
detecting the time said secondary energy enters said collection volume.

68. A method as in claim 67 wherein:
said energy position detecting step comprises the step of sensing the position of said secondary energy within said collection volume along a first coordinate axis; and
said method further includes the steps of:
(a) creating secondary energy in said space, and
(b) determining the position of creation of secondary energy in said space along a second coordinate axis perpendicular to said first coordinate axis in response to the time detected by said time detecting step.

69. A method of detecting radiation comprising the steps of:
(1) producing at least one charge carrier in a medium in response to radiation incident to the medium;
(2) non-randomly changing the position of said charge carrier relative to said medium in a first direction;
(3) changing the position of said medium synchronously with the change in position of said charge carrier in a second direction opposite to the first direction; and
(4) detecting charge carriers in said medium.

70. A method as in claim 69 wherein said medium position changing step (3) comprises the step of moving said medium in a direction opposite to the direction of motion of said charge carrier at a velocity equal in magnitude to the velocity of said charge carrier.

71. A method as in claim 69 wherein said charge carrier position changing step (2) includes the step of producing a uniform electric field within said medium.

72. A method as in claim 71 wherein:
said electric field produced by said electric field producing step induces said charge carrier to drift through said medium at a first substantially constant velocity in the first direction; and
said medium position changing step (3) comprises the step of displacing said medium at a first velocity in the second direction opposite to said first direction.

73. A method as in claim 72 further comprising the step of directing said incident radiation toward said medium in a direction perpendicular to said first and second directions.

74. A method as in claim 72 wherein said electric field produced by said field producing step is in a direction parallel to said first and second directions.

75. A method as in claim 69 wherein said charge carrier position changing step (2) includes the step of inducing said charge carriers to drift through said medium at a constant drift velocity in a predetermined direction.

76. A method as in claim 69 wherein said detecting step (4) comprises the step of detecting particles within a collection volume defined adjacent to said medium.

77. A method as in claim 69 wherein said detecting step (4) comprises the steps of:
detecting the position of charge carriers within a collection volume defined adjacent to said medium; and
detecting the time said charge carriers enter said collection volume.

78. A method as in claim 77 wherein:
said charge carrier position detecting step comprises the step of sensing the position of charge carriers within said collection volume along a first coordinate axis; and
said method further includes the step of determining the position in said medium along a second coordinate axis perpendicular to said first coordinate axis at which said charge carrier was produced in response to the time detected by said time detecting step.

79. A method of storing information comprising the steps of:
(1) selectively producing charge carriers in a medium with a charge carrier producing means;
(2) preventing said charge carriers produced by said producing step (1) from recombining by biasing said charge carriers to move in a first direction;
(3) displacing said medium relative to said charge carrier producing means in a second direction opposite to the first direction; and
(4) detecting charge carrier within a predetermined portion of said medium.

80. A method as in claim 79 wherein said recombining preventing step (2) comprises the step of non-randomly changing the position of said charge carriers relative to said medium.

81. A method as in claim 79 wherein said charge carriers producing step (1) comprises the steps of:
producing ionizing radiation; and
selectively directing said ionizing radiation into said medium.

82. A method of integrating charge comprising the steps of:
(1) continuously directing radiation along a path passing through a medium;
(2) producing secondary energy in said medium in proximity to said path in response to said radiation;
(3) maintaining said secondary energy in proximity to said path and preventing said secondary energy from recombining with said medium; and
(4) measuring the amount of secondary energy in proximity to said path.

83. A method as in claim 82 wherein said maintaining step (3) includes the steps of:
displacing said secondary energy relative to said medium; and
displacing said medium relative to said path synchronously with the displacement of secondary energy performed by said energy displacing step.

84. A method as in claim 83 wherein said energy displacing step comprises the step of inducing said secondary energy to drift through said medium at a constant drift velocity in a predetermined direction.

85. A method as in claim 83 wherein:
said secondary energy includes ions; and
said energy displacing step includes the step of producing a uniform electric field through said medium.

86. A method as in claim 85 wherein:
said electric field produced by said electric field producing step induces said ions to drift through said medium at a first substantially constant velocity in a first substantially constant direction; and
said medium displacing step comprises the step of displacing said medium at said first velocity in a second direction opposite to said first direction.

87. A method as in claim 86 wherein said electric field producing step comprises the step of producing an electric field having a direction parallel to said first and second directions.

88. A method as in claim 86 wherein said path is perpendicular to said first and second directions.

89. A method as in claim 86 wherein said radiation directing step (1) includes the steps of:
producing x-radiation; and
focusing said x-radiation into a beam perpendicular to said first and second directions.

90. A method as in claim 82 wherein:
said radiating directing step (1) includes the step of selectively directing radiation along a plurality of parallel paths passing through said medium to produce secondary energy in proximity to each said paths; and
said maintaining step (3) includes the step of maintaining secondary energy produced in proximity to each of said plurality of paths in proximity to each said paths.

91. A method as in claim 82 wherein said measuring step (4) comprises the step of measuring the secondary energy within a collection volume defined adjacent to said medium.

92. A method as in claim 91 wherein said measuring step (4) includes the steps of:
detecting the position of secondary energy within said collection volume; and
detecting the time said secondary energy enters said collection volume.

93. A method as in claim 92 wherein:
said energy position-detecting step comprises the step of sensing the position of secondary energy in said collection volume along a first coordinate axis; and
said method further includes the step of determining the position in said medium along a second coordinate axis perpendicular to said first coordinate axis at which secondary energy was produced by said energy producing step (2) in response to the time detected by said time detecting step.

94. A method of detecting the spatial distribution and intensity of radiation, comprising:
(1) producing ionizing radiation at a radiation source;
(2) directing said ionizing radiation produced by said producing step (1) into a gap defined between a first means for conducting electrical current and a second means for conducting electrical current, said first and second conducting means fixed in position with respect to one another;
(3) ionizing a medium disposed within said gap in response to said radiation directed by said radiation directing step (2) to produce charge carriers in said gap;
(4) inducing the charge carriers produced by said ionizing step (3) to drift at a velocity $v_{drift}$ in a first direction;
(5) moving said medium relative to said source in a second direction opposite to said first direction at a velocity $v_{scan}$ having a magnitude substantially equal to the magnitude of the velocity $v_{drift}$ of said drifting charge carriers; and
(6) detecting charge carriers in said gap.

95. A method as in claim 94 wherein said radiation directing step (2) comprises the step of focusing, with a focusing means, said radiation into a beam aimed toward said gap in a direction perpendicular to said first and second directions.

96. A method as in claim 95 wherein said moving step (5) includes the step of maintaining said focusing means in a predetermined orientation with respect to said gap.

97. A method as in claim 94 wherein:
said medium comprises a pressurized fluid; and
said method further includes the step of selecting the drift velocity $v_{drift}$ of said charge carriers, said drift velocity selecting step including the step of adjusting the pressure of said fluid.

98. A method as in claim 97 wherein:
said charge carrier drift inducing step (4) includes the step of producing an electric field between said first and second conducting means; and
said drift velocity selecting step further includes the step of adjusting the intensity of said electric field.

99. A method as in claim 94 wherein:
said charge carrier drift inducing step includes the step of producing an electric field between said first and second conducting means; and
said method further includes the step of selecting the drift velocity $v_{drift}$ of said charge carriers, said selecting step including the step of adjusting the intensity of said electric field.

100. A method as in claim 94 wherein:
said second conducting means comprises plural respective electrodes each disposed a predetermined distance from said first conducting means; and
said detecting step (6) includes the step of sensing signals induced in said plural electrodes by said charge carriers.

101. A method as in claim 100 wherein said sensing step comprises the step of sensing the currents flowing in said plural electrodes with respect to time.

102. A method as in claim 101 wherein:
said plural electrodes are arranged in a linear array along a first coordinate axis; and
said method further includes steps of:
determining the spatial distribution of said radiation along said first coordinate axis in response to the relative amplitudes of said currents sensed by said current sensing step; and
determining the spatial distribution of said radiation along a second coordinate axis perpendicular to said first coordinate axis in response to the amplitudes of said currents sensed by said current sensing step with respect to time.

103. A method as in claim 102 wherein said second coordinate axis spatial distribution determining step includes the step of sampling said sensed currents at a predetermined sampling rate corresponding in duration to the length of a desired resolution element along said second coordinate axis.

104. A method as in claim 94 wherein said moving step (5) rotates said first and second conducting means at a constant velocity $v_{scan}$ along a circle having a center at said radiation source.

105. A method as in claim 94 wherein said charge carrier drift inducing step (4) comprises the step of producing a uniform constant electric field between said first and second conducting means.

106. A method as in claim 105 wherein:
said first and second conducting means are disposed on first and second walls, respectively, of an enclosure, said enclosure including a third wall attached to said first and second walls; and
said method further comprises the step of correcting distortions in said electric field in proximity to a first surface of said third wall within said enclosure.

107. A method as in claim 106 wherein said correcting step includes the step of forcing a constant potential gradient to exist in proximity to said third wall first surface.

108. A method as in claim 107 wherein said forcing step comprises the step of applying electrical potential to a sheet of resistive material disposed on said third wall first surface.

109. A method as in claim 107 wherein said forcing step comprises the steps of:
producing plural voltage levels; and
applying said plural voltage levels to plural electrically conductive strips disposed on said third wall first surface parallel to at least one of said first and second conducting means.

110. A method as in claim 94 further including the step of selectively changing the mobility of only one of the positive charge carriers and the negative charge carriers produced in said medium.

111. A method of detecting the spatial distribution and intensity of ionizing radiation, comprising the steps of:
(1) admitting ionizing radiation into a chamber along at least a first path via a window defined in the chamber;
(2) ionizing a medium disposed within said chamber in response to said radiation admitted by said radiation admitting step (1) to produce plural charge carrier pairs, each of said charge carriers pairs comprising a positive charge carrier and a negative charge carrier;
(3) producing a substantially uniform, constant electric field between a first substantially planar surface contacting said medium, said first surface defined by an electrically conductive electrode disposed with said chamber, and a plane containing planar surfaces defined by plural respective electrically conductive collection electrodes disposed in said chamber, said planar surfaces contacting said medium, said plane disposed a fixed distance from said first electrode, the direction of said electric field being substantially perpendicular to the path of said radiation, said electric field causing one of the positive and negative charge carriers of each of said charge carrier pairs to drift in a first direction toward said plane at a substantially constant drift velocity $v_{drift}$;
(4) moving said chamber in a second direction opposite to said first direction at a constant velocity $v_{scan}$ having a magnitude substantially equal to the magnitude of $v_{drift}$;
(5) sensing the currents flowing in said plural collection electrodes resulting from charges produced on said collection electrodes by said charge carriers; and
(6) determining the spatial distribution in two dimensions of said radiation admitted into said chamber in response to the amplitude with respect to time of the currents sensed by said currents sensing step (5).

112. A method as in claim 111 further including the steps of:
continuously producing ionizing radiation at a radiation source;
collimating said radiation produced by said radiation producing step into a beam; and
directing said beam perpendicular to the direction of said electric field toward said window.

113. A method as in claim 112 wherein said chamber moving means (4) comprises the step of translating said chamber at a constant velocity $v_{scan}$ along a circle having a center at said radiation source.

114. A method as in claim 111 wherein:
said plural collection electrodes are arranged in a substantially linear array along a first coordinate axis;
said spatial distribution determining step (6) comprises the steps of:
determining the spatial distribution of said radiation along said first coordinate axis in response to the relative amplitudes of the currents sensed by said currents sensing step (5), and
determining the spatial distribution of said radiation along a second coordinate axis perpendicular to said first coordinate axis in response to the amplitudes of said currents sensed by said currents sensing step (5) with respect to time; and
said currents sensing step (5) includes the step of sampling said currents at a predetermined sampling rate corresponding in duration to the length along said second coordinate axis of a desired resolution element.

* * * * *